United States Patent [19]
Muramoto et al.

[11] Patent Number: 5,485,209
[45] Date of Patent: Jan. 16, 1996

[54] PUPIL DIVISIONAL TYPE FOCUSING POSITION DETECTION APPARATUS FOR ELECTRONIC CAMERAS

[75] Inventors: Tomotaka Muramoto, Tokyo; Nobuhiro Takeda, Kawasaki, both of Japan

[73] Assignee: Canon Kabushiki Kaisha, Tokyo, Japan

[21] Appl. No.: 406,792

[22] Filed: Mar. 20, 1995

Related U.S. Application Data

[63] Continuation of Ser. No. 40,437, Apr. 1, 1993, abandoned.

[30] Foreign Application Priority Data

| Apr. 3, 1992 | [JP] | Japan | 4-110679 |
| Sep. 22, 1992 | [JP] | Japan | 4-279434 |
| Mar. 22, 1993 | [JP] | Japan | 5-061810 |
| Mar. 24, 1993 | [JP] | Japan | 5-089390 |
| Mar. 26, 1993 | [JP] | Japan | 5-092036 |

[51] Int. Cl.$^6$ .................................................. H04N 5/232
[52] U.S. Cl. .................................................. 348/349; 348/345
[58] Field of Search .................................. 348/345, 349, 348/353, 350, 351, 352, 354

[56] References Cited

U.S. PATENT DOCUMENTS

| 3,511,156 | 5/1970 | Larks | 95/45 |
| 4,185,191 | 1/1980 | Stauffer | 250/204 |
| 4,373,791 | 2/1983 | Araki | 354/25 |
| 4,668,991 | 5/1987 | Theuwissen et al. | 348/349 |

*Primary Examiner*—Donald J. Yusko
*Assistant Examiner*—Michael Day
*Attorney, Agent, or Firm*—Fitzpatrick, Cella, Harper & Scinto

[57] ABSTRACT

An apparatus for detecting a focus adjustment state of an objective lens includes a photoelectric converter, which has a photosensor array, for receiving a light beam transmitted through the objective lens. An area defining device defines different areas of a pupil of the objective lens, and is arranged so that light beams passing through the areas overlap each other on the photoelectric converter when the objective lens is at an in-focus state. A calculator calculates an autocorrelation from an output signal from the photoelectric converter.

20 Claims, 25 Drawing Sheets

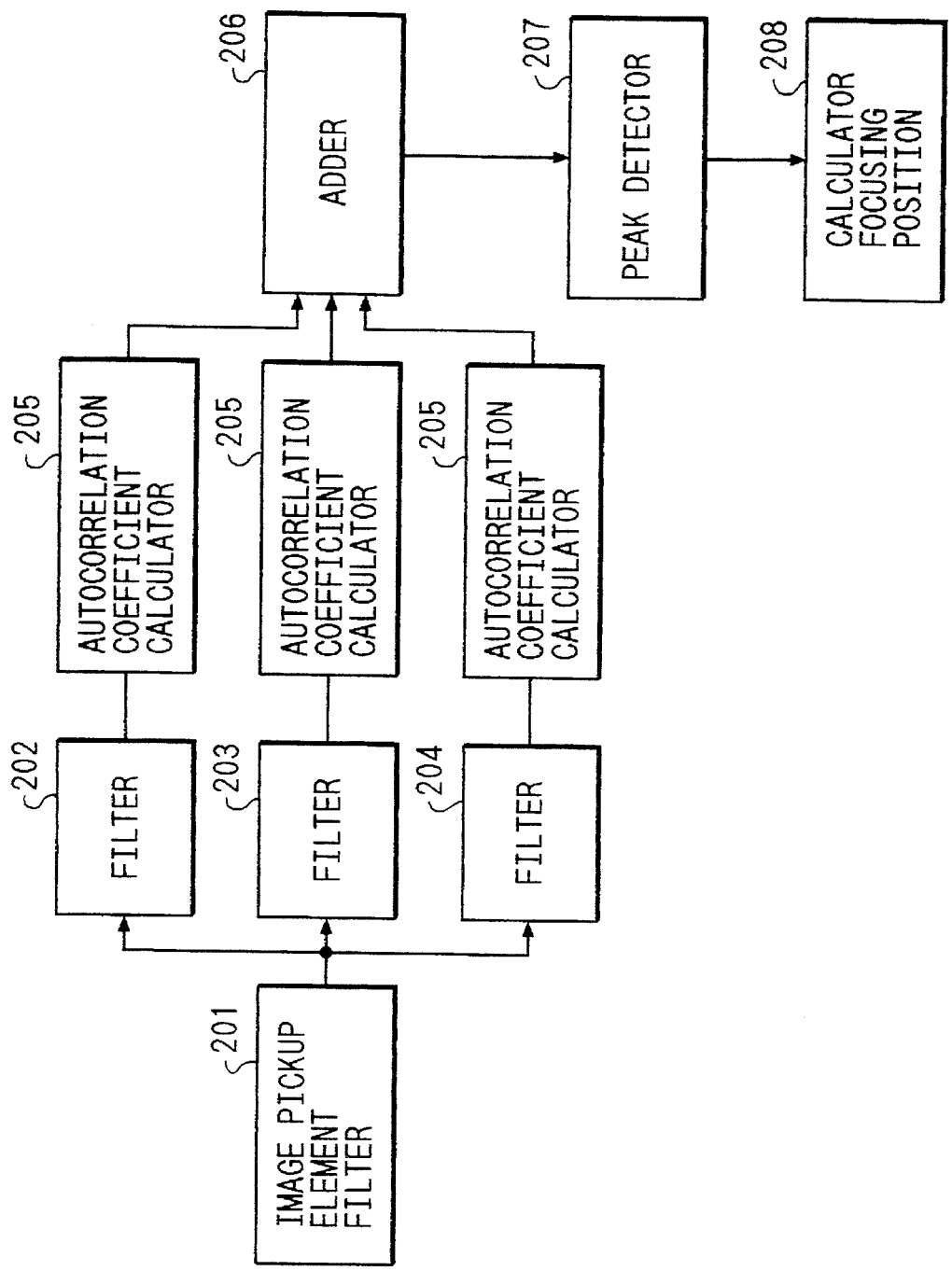

FIG. 31
| 0 | -1 | 0 |
|---|----|---|
| -1 | 4 | -1 |
| 0 | -1 | 0 |
FIG. 32A
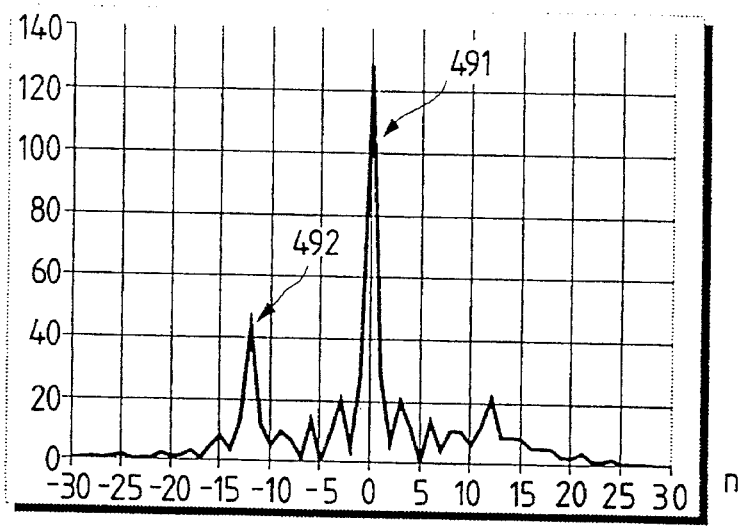
FIG. 32B
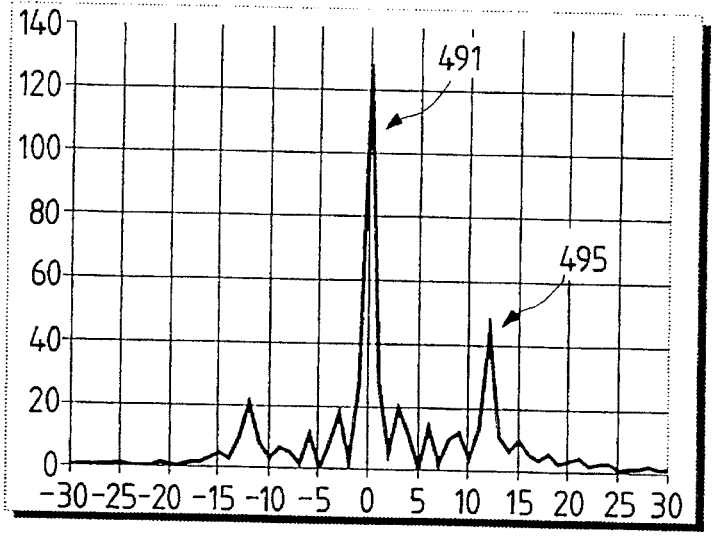

FIG. 33A

|     | -1 | 0  | 1  |
|-----|----|----|----|
| -1  | 0  | -1 | 0  |
| 0   | -1 | 4  | -1 |
| 1   | 0  | -1 | 0  |

|     | -2 | -1 | 0  | 1  | 2 |
|-----|----|----|----|----|---|
| -2  | 0  | 0  | -1 | 0  | 0 |
| -1  | 0  | 0  | 0  | 0  | 0 |
| 0   | -1 | 0  | 4  | 0  | 1 |
| 1   | 0  | 0  | 0  | 0  | 0 |
| 2   | 0  | 0  | -1 | 0  | 0 |

|     | -3 | -2 | -1 | 0  | 1 | 2 | 3  |
|-----|----|----|----|----|---|---|----|
| -3  | 0  | 0  | 0  | -1 | 0 | 0 | 0  |
| -2  | 0  | 0  | 0  | 0  | 0 | 0 | 0  |
| -1  | 0  | 0  | 0  | 0  | 0 | 0 | 0  |
| 0   | -1 | 0  | 0  | 4  | 0 | 0 | -1 |
| 1   | 0  | 0  | 0  | 0  | 0 | 0 | 0  |
| 2   | 0  | 0  | 0  | 0  | 0 | 0 | 0  |
| 3   | 0  | 0  | 0  | -1 | 0 | 0 | 0  |

(n = 3)

PUPIL DIVISIONAL TYPE FOCUSING POSITION DETECTION APPARATUS FOR ELECTRONIC CAMERAS

This application is a continuation, of application Ser. No. 08/040,437 filed Apr. 1, 1993, now abandoned.

BACKGROUND OF THE INVENTION

1. Field of the Invention

The present invention relates to an in-focus detection apparatus suitable for a still camera or a video camera and, more particularly, to an in-focus detection apparatus in which an exit pupil of a photographing lens (objective lens) is divided into a plurality of areas, a plurality of object images are formed on a surface of an image pickup means using light beams passing through the divided areas, and an autocorrelation of image information obtained by the image pickup means is calculated, thereby detecting an in-focus state of the photographing lens.

2. Related Background Art

Conventionally, as a passive type focus detection system, which utilizes a light beam transmitted through an objective lens, and has relatively high in-focus detection precision, an in-focus detection apparatus utilizing a plurality of pieces of image information based on light beams passing through a plurality of different areas on a pupil of a photographing lens is known (U.S. Pat. No. 3,511,156, and the like). For example, U.S. Pat. No. 4,185,191 proposes an apparatus in which a movable portion of such an in-focus detection apparatus is omitted.

FIGS. 36 to 38 are enlarged views of an in-focus detection apparatus proposed in this patent, and its portion.

An optical system shown in FIG. 36 includes a photographing lens (objective lens) 601 and a detachable mirror 605. In a normal photographing mode, the mirror 605 is escaped outside a photographing optical path. At this time, an object image (image information) based on a light beam transmitted through the photographing lens 601 is formed on the surface of an image pickup means 602, On the other hand, in an in-focus detection mode, as shown in FIG. 36, the mirror 605 is inserted from the position outside the optical axis into the optical path. Two object images based on light beams passing through two different areas (pupil areas) 603 and 604 on a pupil surface of the photographing lens 601 are reflected by the mirror 605, and are guided toward an in-focus information detection element 606.

The in-focus information detection element 606 has an arrangement shown in FIGS. 37 and 38. FIG. 37 shows a focusing state of light beams when the photographing lens 601 is set in an in-focus state, and FIG. 38 shows a focusing state of light beams when the lens 601 is set in a near-focus state (light-receiving elements are located behind the image formation plane).

In FIGS. 37 and 38, a lens member 621 consists of an array of a plurality of small lenses for separately imaging incident light beams, and a light-receiving means 622 consists of en array of pairs of light-receiving elements for receiving the light beams transmitted through the small lenses.

Of these light-receiving elements, light-receiving elements $S_a$, $T_a$, $U_a$, $V_a$, ... receive a light beam 624 passing through the pupil area 604, and light-receiving elements $S_b$, $T_b$, $U_b$, $V_b$, ... receive a light beam 623 passing through the pupil area 603.

In the in-focus state shown in FIG. 37, of a light beam from a certain portion of an object, a light beam passing through the pupil area 604 forms an image on the light-receiving element $T_a$, and of the light beam from the same portion of the object, a light beam passing through the pupil area 603 forms an image on the light-receiving element $T_b$.

Similarly, of light beams from other portions of the object, light beams passing through the pupil areas 603 and 604 respectively form images on the pairs of neighboring light-receiving elements $S_a$ and $S_b$, $U_a$ and $U_b$, and $V_a$ and $V_b$.

In contrast to this, when the photographing lens is set in the near-focus state, as shown in FIG. 38, a light beam 623 corresponding to a light beam 624, which forms an image on the light-receiving element $T_a$, forms an image on, e.g., the light-receiving element $U_b$. Similarly, light beams from other portions form images on the light-receiving elements shifted one by one from the paired light-receiving elements.

Thus, when signals received by a light-receiving element group (a group a) consisting of the light-receiving elements $S_a$, $T_a$, $U_a$, $V_a$, ... are compared with signals received by a light-receiving element group (a group b) consisting of the light-receiving elements $S_b$, $T_b$, $U_b$, $V_b$, ..., the in-focus state of the photographing lens 601 is detected.

Furthermore, the defocusing amount and direction of the photographing lens 601 are detected by calculating a correlation of the output signals from the groups a and b.

In general, a conventional in-focus detection apparatus requires a certain relative positional precision between the image pickup element and the in-focus information detection element. In particular, when the area of the image pickup element is small, it is difficult to detect a position with high precision in a manufacturing process. When the positional relationship between the image pickup means 602 and the in-focus information detection element 606 is adversely affected by aging or a change in temperature, in-focus detection precision is impaired. Since extra detection means (lenses, light-receiving elements, and the like) for in-focus detection are required in addition to a photographing optical system for a photographing operation, the entire apparatus is complicated, and cost is increased. Since the in-focus information detection element 606 must be arranged outside the optical path of the photographing optical system, a compact structure of the camera is disturbed. Furthermore, in order to detect an in-focus position, calculations must be performed while shifting data from the two light-receiving element groups so as to find out a maximum correlation position, resulting in a long calculation time. Since a lens for splitting an optical path is used in addition to the photographing lens, a distance measurement system suffers from shading, distortion, and the like, and detection precision is impaired.

SUMMARY OF THE INVENTION

It is an object of the present invention to provide an apparatus using a new detection method of detecting a focus adjustment state.

It is another object of the present invention to obtain in-focus information on the basis of a calculation result, which is obtained by converging light beams passing through different zones of a pupil of an objective lens on an image pickup element to overlap each other, and calculating an autocorrelation function based on output signals obtained from the image pickup element.

It is still another object of the present invention to detect a focus adjustment state of an objective lens using an image pickup element for photographing or recording an image of an object.

Other objects of the present invention will become apparent from the following detailed description of the embodiments.

BRIEF DESCRIPTION OF THE DRAWINGS

FIG. 10 is an electrical block diagram showing still another embodiment of the present invention;

FIG. 31 is a view showing an example of a digital filter;

FIGS. 32A and 32B are graphs showing correlation calculation results;

FIGS. 33A, 33B, and 33C are views showing examples of a digital filter;

DESCRIPTION OF THE PREFERRED EMBODIMENTS

Figure 1:
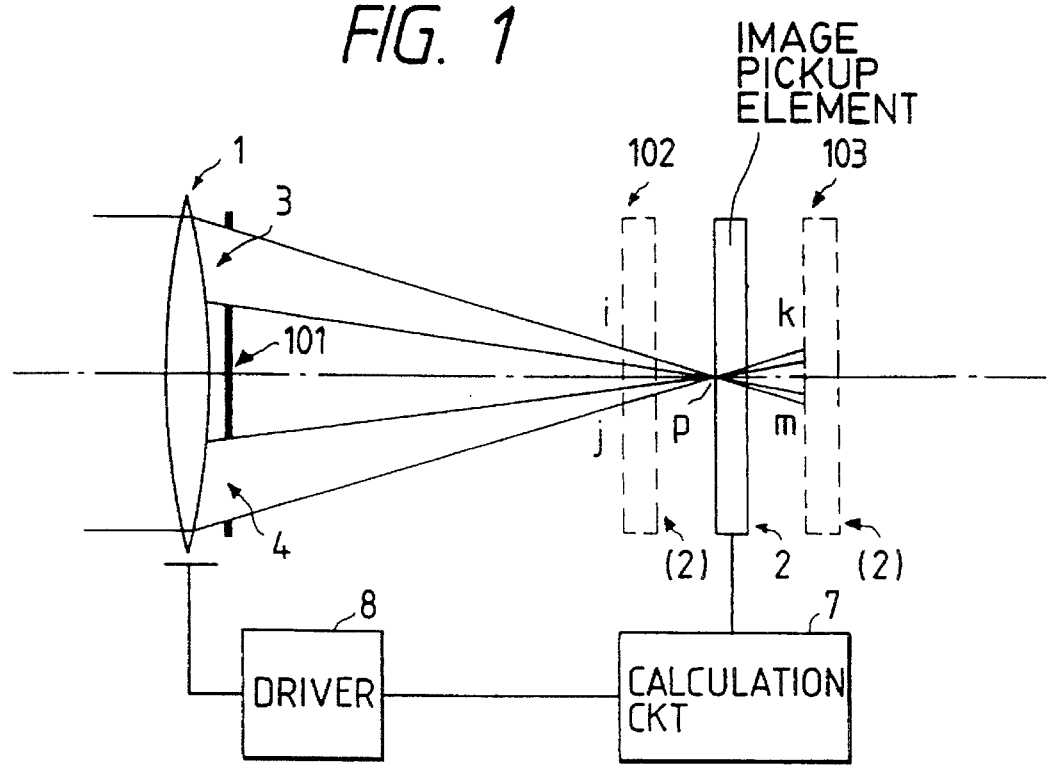
FIG. 1 is a view showing an optical arrangement according to the first embodiment of the present invention.

FIG. 1 is a view showing an optical arrangement according to the first embodiment of the present invention.

The optical arrangement shown in FIG. 1 includes a photographing lens 1, which is normally constituted by a plurality of lens elements, and an image pickup means or element 2, which comprises an image pickup element such as a CCD. In FIG. 1, although the photographing lens 1 is displaced in the optical axis direction in practice, the image pickup element is illustrated at a different position. That is, in FIG. 1, the image pickup means 2 is illustrated at a position in an in-focus state.

A light-shielding member 101 has two apertures, and is detachably inserted in a photographing optical path. When the member 101 is arranged in the optical path, it splits a pupil (exit pupil) of the photographing lens 1 into two areas (first and second pupils) 3 and 4. A case will be described later with reference to FIG. 16 wherein the light-shielding member 101 has two or more apertures, and splits the pupil into two or more areas to obtain a plurality of pieces of image information.

When the photographing lens 1 is set in a far-focus state, the image pickup element 2 is located at a position 102; when the photographing lens 1 is set in a near-focus state, the image pickup element 2 is located at a position 103.

A calculation circuit 7 calculates an autocorrelation using two pieces of image information obtained by the image pickup element 2. A driver 8 moves the photographing lens 1 or its internal focusing lens (not shown) along the optical axis on the basis of an in-focus signal from the calculation circuit 7 to attain an in-focus state. The calculation circuit 7 adopts a microcomputer.

In this embodiment, when the photographing lens 1 is set in an in-focus state (i.e., when the image pickup element 2 is located at a solid line position), light beams respectively passing through the pupil areas 3 and 4 form images at an identical position P on the surface of the image pickup element 2.

In a far-focus state, i.e., when the image pickup element 2 is located at the position 102, since the image pickup element 2 is located before the image formation plane of the light beams, a light beam passing through the first pupil 3 forms a slightly blurred image at a position i, and a light beam passing through the second-pupil 4 forms a slightly blurred image at a position j.

As shown in FIG. 1, in consideration of image formation light beams from an object located on the optical axis, the pupil area (aperture portion) 3 and the position i are located at the same side with respect to the optical axis of the photographing lens 1, and the pupil area (aperture portion) 4 and the position j are also located at the same side with respect to the optical axis. As for light beams outside the optical axis, the same relationship is established for principal rays of all image formation light beams outside the optical axis. In a near-focus state, i.e., when the image pickup element 2 is located at the position 103, since the image pickup element 2 is located behind the image formation plane of light beams, a light beam passing through the first pupil 3 forms a slightly blurred image at a position m, and a light passing through the second pupil 4 forms a slightly blurred image at a position k.

As shown in FIG. 1, in consideration of image formation light beams from an object located on the optical axis, the existing areas of light beams are reversed when the light beams pass an image formation point, and the position m of the first pupil 3 and the position k of the second pupil 4 exist at opposite sides with respect to the optical axis of the photographing lens 1. As for light beams outside the optical axis, the same relationship is established for principal rays of all image formation light beams outside the optical axis.

In this embodiment, an autocorrelation of signals based on object images (image information) formed on the surface of the image pickup element 2 is calculated by the calculation circuit 7 to detect whether or not the photographing lens 1 is set in an in-focus state. Furthermore, when the photographing lens 1 is not set in the in-focus state, the defocusing amount is measured.

More specifically, the signals based on object images formed on the surface of the image pickup element 2 are output as electrical signals having a time base t as a variable. If this signal is represented by x(t), an autocorrelation $C(\tau)$ is given by:

$$C(\tau) = 1/T \int_0^T x(t) \times x(t+\tau) dt \quad (1)$$

When the calculation result of equation (1) is normalized by C(O), an autocorrelation coefficient $C_O(\tau)$, which has a maximum value "1" when $\tau=0$, can be obtained.

Figure 2:
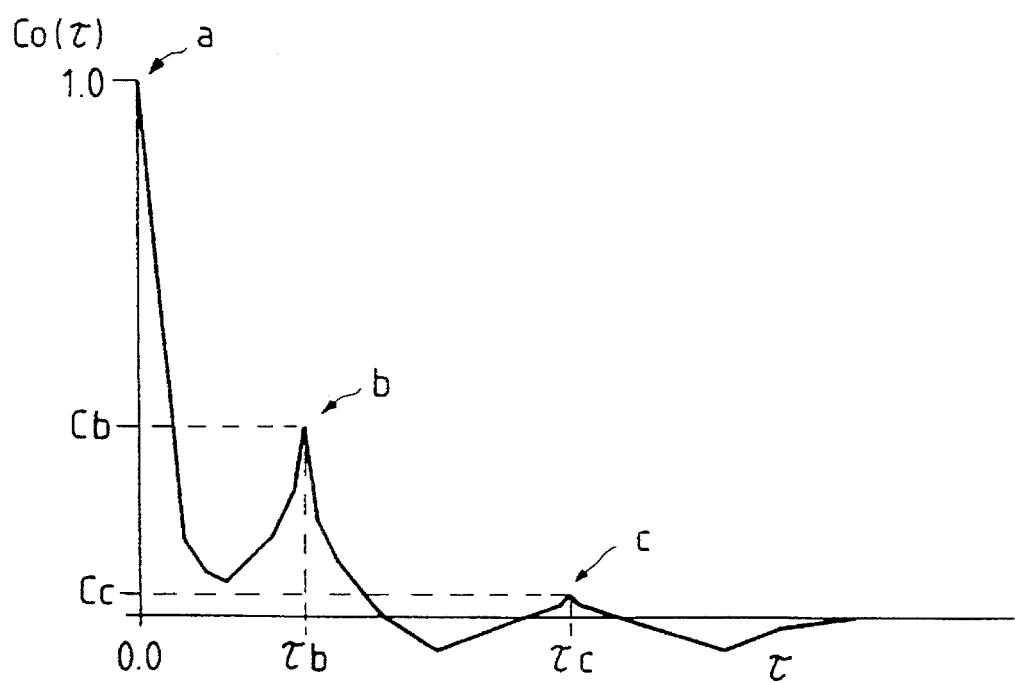
FIG. 2 is a graph showing an example of an autocorrelation function according to the first embodiment.
Figure 3:
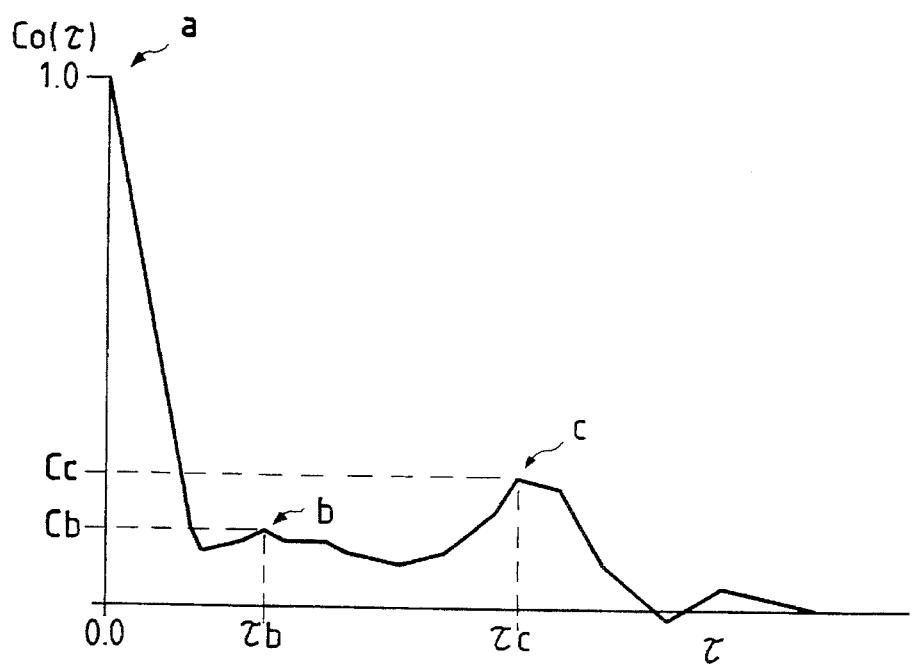
FIG. 3 is a graph showing another example of the autocorrelation function.

FIGS. 2 and 3 are graphs for explaining the autocorrelation functions calculated by the calculation circuit 7.

As shown in FIGS. 2 and 3, each autocorrelation function $C_O(\tau)$ has three peaks a, b, and c. The peak a is present at a position of $\tau=0$, and always assumes a maximum value. In an out-of-focus state, a peak appears at a position corresponding to the defocusing amount in addition to the peak a. When $\tau$ corresponding to the maximum peak position excluding the peak a is to be obtained, $\tau b$ is found from FIG. 2, and $\tau c$ is found from FIG. 3.

$\tau b$ and $\tau c$ indicate strong correlations at pixel distances corresponding to transfer times $\tau b$ and $\tau c$ of the image pickup element 2 in FIGS. 2 and 3, respectively, and these pixel distances correspond to an interval between the points i and j and that between the points k and m on the surface of the image pickup element 2, respectively.

In this embodiment, as described above, the peaks of image information are detected by the calculation circuit 7, thereby obtaining the distance between object images formed on the surface of the image pickup element 2 and based on light beams passing through the different pupil areas. When this distance is converted by the focal length K of the photographing lens 1, the defocusing amount can be calculated.

The driver 8 moves the focusing lens (not shown) of the photographing lens 1 along the optical axis on the basis of the defocusing amount calculated by the calculation circuit 7, thus executing a focusing operation.

In a real photographing operation, the defocusing amount must be detected by calculating the autocorrelation functions $C_O(\tau)$, and the direction of the focusing position must be discriminated. A method of discriminating the direction of the focusing position utilizing luminance nonuniformity in the system shown in FIG. 1 will be described below.

Figure 4:
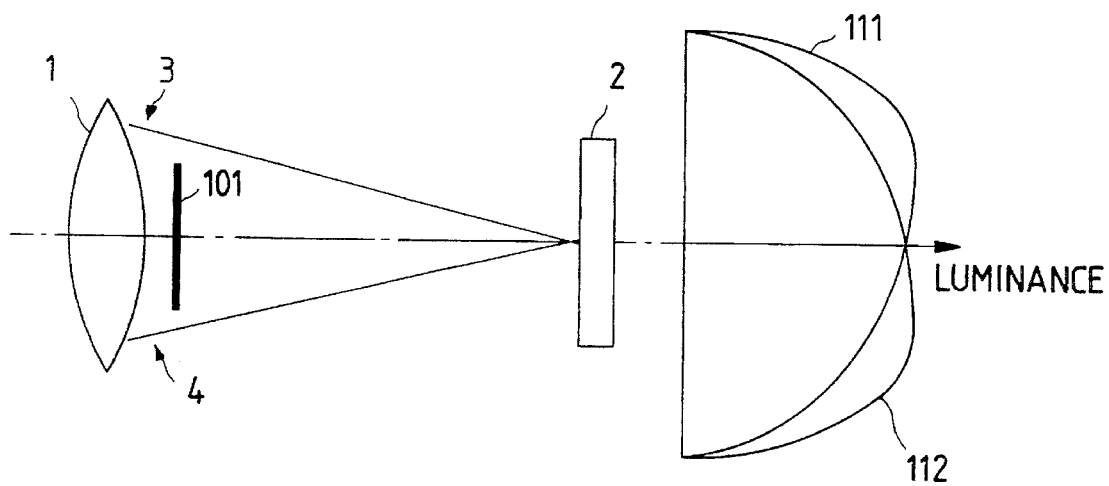
FIG. 4 is a view showing a light amount distribution by an optical system.

As is generally known, luminance nonuniformity occurs on the surface of an image pickup element in an optical system having a limited pupil. FIG. 4 shows an example of luminance nonuniformity in the embodiment shown in FIG. 1. A light beam passing through the first pupil position 3 exhibits, on the image pickup element 2, a luminance distribution, which has a weight at the side where the first pupil 3 is present, as indicated by a curve 111. A light beam passing through the second pupil 4 exhibits a luminance distribution represented by a curve 112, which is axially symmetrical with the curve 111, and has a weight at the side where the second pupil 4 is present.

Figure 5:
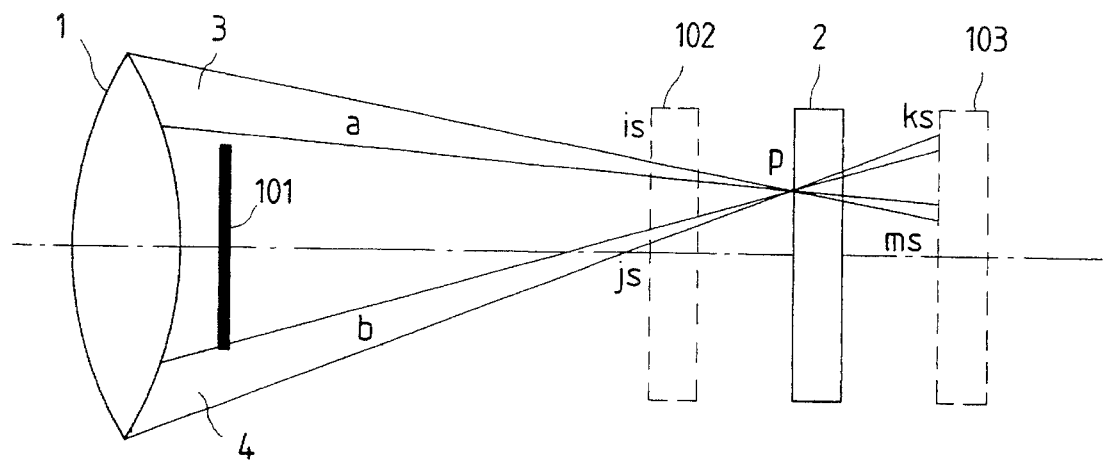
FIG. 5 is a view for explaining behaviors of light beams from the optical system.

FIG. 5 shows a state of light beams, which form images at positions slightly separated from the optical axis in the system shown in FIG. 1. When the image pickup element 2 is located at an in-focus position, light beams a and b respectively passing through the first and second pupils 3 and 4 form images at the same position P on the image pickup element 2. In a far-focus state, since the image pickup element 2 is located at the position 102, the light beams a and b respectively passing through the first and second pupils 3 and 4 form slightly blurred images at positions $i_s$ and $j_s$, respectively. In a near-focus state, since the image pickup element 2 is located at the position 103, the light beams a and b respectively passing through the first and second pupils 3 and 4 form slightly blurred images at positions $m_s$ and $k_s$, respectively.

In consideration of the luminance distributions shown in FIG. 4, when the image pickup element 2 is located at the position 102, i.e., in the far-focus state, output signals x from the image pickup element 2 satisfy:

$$x(\tau(i_s)) > x(\tau(j_s))$$

More specifically, a signal $x_{near}$ (in this case, $x(\tau(i_s))$ closer to the optical axis becomes larger. Conversely, when the image pickup element 2 is located at the position 103, i.e., in a near-focus state, the output signals x satisfy:

$$x(\tau(k_s)) < x(\tau(m_s))$$

Thus, a signal $x_{far}$ (in this case, $x(\tau(m_s))$ farther from the optical axis becomes larger.

In this manner, the direction of the focusing position can be determined by comparing the magnitude $x_{far}$ of an output signal from a pixel farther from the optical axis and the magnitude $x_{near}$ of an output signal from a pixel closer to the optical axis at two points separated by a pixel distance D, which has already been known by peak detection of the autocorrelation functions $C(\tau)$. After the direction and amount are determined, the photographing lens 1 or the image pickup element 2 is moved by a driving system (not shown) to correct the relative distance therebetween in the optical axis direction, thus bringing the apparatus to an in-focus state.

Figure 6:
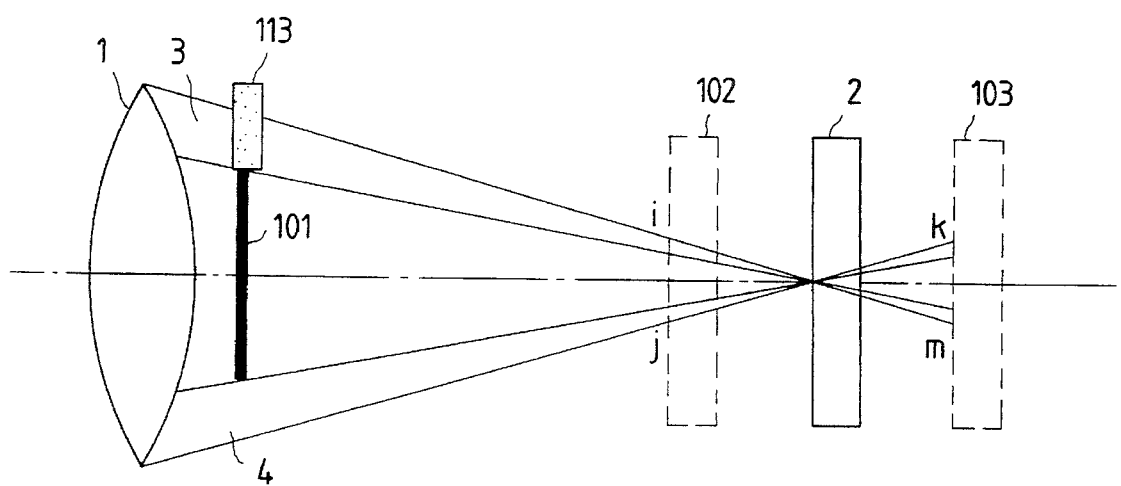
FIG. 6 is an optical sectional view showing another embodiment of the present invention.

FIG. 6 is a schematic view showing main part of the second embodiment of the present invention. The same reference numerals in FIG. 6 denote the same parts as in FIG. 1.

A difference of this embodiment from FIG. 1 is that a semi-transparent filter 113 is arranged at the position of the first pupil 3 to attenuate light incident on the first pupil 3. As a result, the light beams passing through the first and second pupils 3 and 4 have different amounts even though the aperture shapes of these pupils remain the same.

The position of an image corresponding to a light beam passing through the first pupil 3 is a position i in a near-focus state, i.e., when the image pickup element 2 is located at the position 102; it is a position m in a far-focus state, i.e., when the image pickup element 2 is located at the position 103. Under the influence of the filter 113, the amounts of light at the positions i and m are smaller than those at image formation positions j and k of light beams passing through the second pupil 4, which is not influenced by the attenuation filter 113.

In this embodiment as well, the defocusing amount is detected by detecting peak positions having values exceeding a threshold value from autocorrelation functions, and obtaining the relationship between images formed on the image pickup element 2 and passing through the different-pupil positions like in the first embodiment. The defocusing amount can be easily converted based on the image distance obtained from the relationship and the f-number of light beams which form images on the image pickup element 2.

The characteristic feature of this embodiment is discrimination of the direction of the focus direction, i.e., a near- or far-focus state. The amount of a light beam passing through the first pupil 3 is attenuated by the filter 113. When the image pickup element 2 is located at the position 102, i.e., in a far-focus state, the relationship between output signals x from the image pickup element 2 satisfies:

$x(\tau(i)) < x(\tau(j))$

On the other hand, when the image pickup element 2 is located at the position 103, i.e., in a near-focus state, the above-mentioned relationship satisfies:

$x(\tau(k)) > x(\tau(m))$

More specifically, in the arrangement shown in FIG. 6, the relative intensity relationship between the signals i and k at upper positions of the image pickup element 2, and signals j and m at lower positions of the element 2 is reversed depending on the near- or far-focus state. This effect is caused by the filter 113, and when the relationship between output signal intensities at two points separated by the pixel distance D, which has already been obtained upon detection of the peak position of the autocorrelation coefficients, is determined, the near- and far-focus states can be discriminated from each other.

Note that the attenuation characteristics of the filter 113 are selected to have a value, which does not influence the relationship between the output signals by the luminance distributions shown in FIG. 4.

As a result, in the second embodiment shown in FIG. 6, the defocusing amount can be determined by detecting the peak positions of the autocorrelation functions, and when the magnitudes of the output signals x at two points separated by the pixel distance D calculated from the defocusing amount and the relationship therebetween are detected, the direction of the focusing position can be easily determined.

In this embodiment, the difference between the amounts of light beams passing through the first and second pupils 3 and 4 plays an important role upon discrimination of the direction. This effect can also be realized by different light amounts obtained using the first and second pupils 3 and 4 having different sizes without using the attenuation filter 113.

In each of the first and second embodiments of the present invention, the focusing position is detected directly using the output signals from the image pickup element 2. However, as for signal processing, various other modifications may be made. For example, the autocorrelation functions may be obtained after the output signals are filtered in advance through filters for extracting a difference between neighboring pixels or high-pass filters such as differential filters so as to emphasize high-frequency components which are important upon determination of the focusing position. These pieces of in-focus information may be calculated either in an analog or digital manner.

Figure 7:
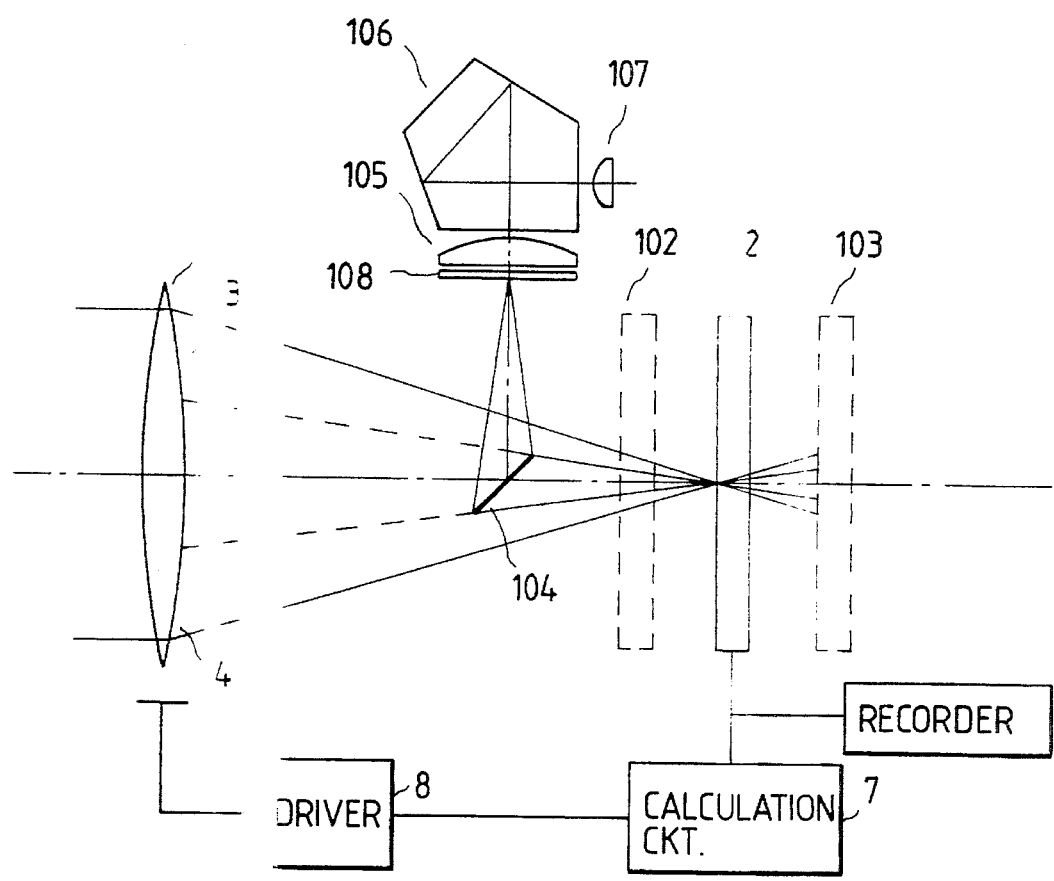
FIG. 7 is an optical sectional view showing an application example of the present invention.

FIG. 7 shows the third embodiment of the present invention. In this embodiment, the present invention is applied to a still video camera in the form of a single-lens reflex camera. In this embodiment, an image to be recorded and an image used in focus detection are received by a single element.

In this embodiment, as a light-shielding member for splitting the pupil of the photographing lens 1 into a plurality of areas, a mirror 104 for guiding a light beam transmitted through the photographing lens 1 to a finder system is used, and other arrangements are substantially the same as those in the first embodiment.

In this embodiment, in an in-focus information detection mode, the mirror 104 is inserted into the photographing optical path. Thus, two object images based on light beams passing through two areas, i.e., the pupil areas 3 and 4, of the photographing lens 1 are formed on the surface of the image pickup element 2.

Of light beams from the photographing lens 1, a light beam reflected by the mirror 104 forms a finder image on the surface of a focusing screen 108. A cameraman observes the finder image on the surface of the focusing screen 108 via an eyepiece lens 107 through a condenser lens 105 and a pentagonal prism 106.

With the above arrangement, an in-focus state is detected as in the first embodiment.

In this embodiment, in a photographing mode, the focusing lens of the photographing lens 1 is driven by the driver 8 on the basis of a signal associated with the defocusing amount of the photographing lens 1 from the calculation circuit 7, and the mirror 104 is escaped from the photographing optical path.

Autocorrelation functions obtained by a calculation means according to the fourth embodiment of the present invention will be described below with reference to FIGS. 8 and 9.

Figure 8:
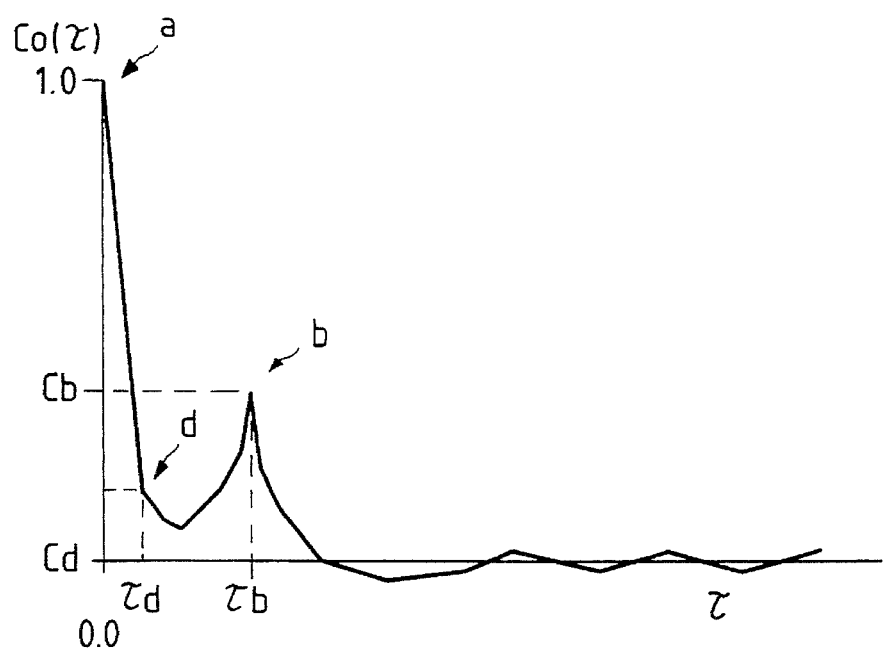
FIG. 8 is a graph showing an example of an autocorrelation function.
Figure 9:
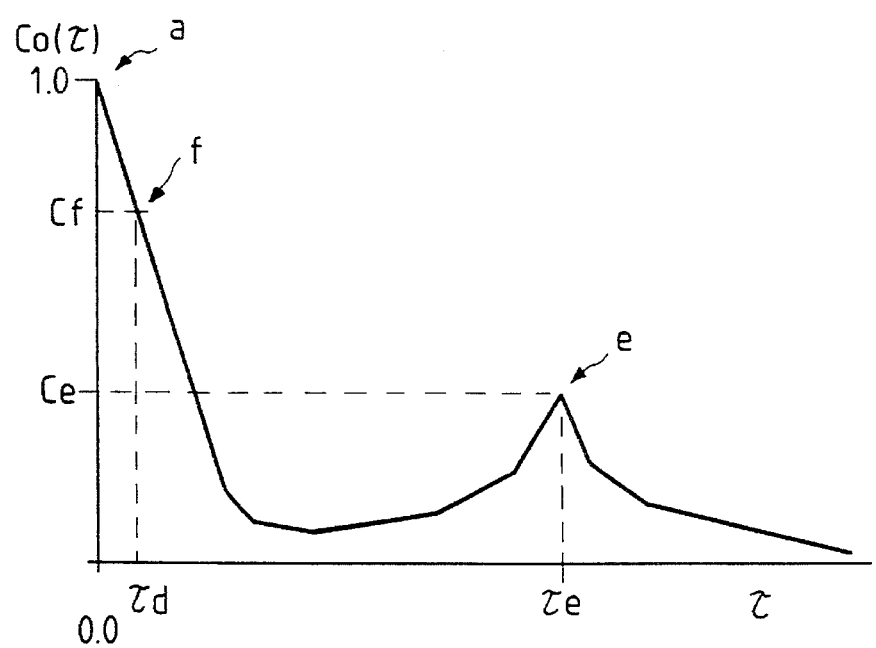
FIG. 9 is a graph showing another example of the autocorrelation function.

FIG. 8 corresponds to a case wherein the defocusing amount of the photographing lens 1 is relatively small, and FIG. 9 corresponds to a case wherein the defocusing amount of the photographing lens 1 is relatively large. A peak b in FIG. 8 is present at a position $\tau b$, and a peak in FIG. 9 is present at a position τe. Since the defocusing amount in FIG. 9 is larger than that in FIG. 8, τb<τe is satisfied. Upon comparison between correlation coefficient values at a position τd where τ is close to zero, a value Cd is obtained from FIG. 8, and a value Cf is obtained from FIG. 9. Thus, Cd<Cf is satisfied.

In this manner, since an image is blurred as the defocusing amount is increased, a correlation at a position where τ is close to zero becomes large. This conversely leads to the fact that when a correlation becomes small at a position where τ is close to zero, the defocusing amount is small (the converse is not true).

Therefore, if a correlation value is equal to or smaller than a predetermined level at a position where τ is close to zero, i.e., at the position τd, a correlation calculation need not be performed for a range having large τ. For this reason, in this embodiment, an autocorrelation calculation is effectively performed by determining a correlation calculation range in accordance with a correlation value at the position τd.

The following inequality (2) expresses the relationship between a calculation range τmax and τd:

$$\tau max \leq C_O(\tau d) \times R \qquad (2)$$

where R is a constant determined by the focal length, pupil diameter, and the like of the photographing lens.

Methods of obtaining autocorrelations by calculation means according to the fifth and sixth embodiments of the present invention will be described below with reference to FIGS. 8 and 9.

Each of the fifth and sixth embodiments executes the same processing as in the first and second embodiments described above until signals based on image information from the image pickup element 2 are detected. The fifth embodiment will be described first with reference to FIGS. 8 and 9.

Upon comparison between a peak b of the autocorrelation function shown in FIG. 8 and a peak e of the autocorrelation function shown in FIG. 9, the peak b is sharper than the peak e. This is because a correlation near the peak position e is increased since the defocusing amount in FIG. 9 is larger than that in FIG. 8. This embodiment utilizes this nature.

More specifically, a normal autocorrelation calculation is performed to have a constant pitch of the time base (pitches of τ). However, as is apparent from FIG. 9, since a change in correlation value also becomes small in a range having large τ, τ can have a coarse pitch.

In this embodiment, for example, the pitch td of the time base is determined as follows so as to greatly reduce the autocorrelation calculation amount, thus achieving efficient calculations.

$$td = S \times \tau \qquad (3)$$

where S is a constant determined by, e.g., the f-number of the photographing lens.

The sixth embodiment of the present invention will be described below with reference to FIGS. 8 and 9.

In general, since image signals in output signals from an image pickup means such as a CCD have a strong correlation between neighboring pixels, peak detection is often disturbed in a range having small In this embodiment, in order to solve this problem, in a range having relatively small τ, original signals are filtered through high-pass filters, and thereafter, autocorrelation calculations are performed.

The high-pass filter in this embodiment is expressed by, e.g., equation (4) or (5):

$$y(t) = x(t+\Delta t) - x(t) \qquad (4)$$

$$y(t) = x(t) - [x(t+\Delta t) + x(t-\Delta t)]/2 \qquad (5)$$

where y(t) is the signal filtered through the filter.

In this embodiment, by utilizing the nature used in the fifth embodiment, i.e., the nature that a correlation near the peak becomes larger in a range having large τ, the filter characteristics may be switched according to the value τ, thus further improving peak detection precision.

In equations (4) and (5), filters are expressed as time-series analog signals. Alternatively, A/D-converted digital data may be filtered through digital filters.

According to the embodiments described above, since an image pickup means used in a normal photographing operation is used as an in-focus information detection means, no problem associated with positional precision between the in-focus information detection means and a photographing system is posed in principle. Since neither a new optical system nor a new light-receiving element are required for in-focus information detection, the entire apparatus can be simplified, and can have a low-cost, compact structure.

FIG. 10 shows an embodiment wherein a change in measurement precision depending on a pattern of an object is prevented.

In FIG. 10, an image pickup element 201 such as a CCD corresponds to the element 2 shown in FIG. 1. Filters 202, 203, and 204 have different characteristics, and are respectively connected to autocorrelation coefficient calculators 205. The outputs from the calculators 205 are supplied to an adder 206. The adder 206 is connected to a focusing position calculator 208 via a peak detector 207.

In the optical arrangement shown in FIG. 1, light beams respectively passing through the first and second pupils form images on the image pickup element. The object images formed on the image pickup element are converted into electrical signals having the time base as a variable by the image pickup element, and the electrical signals are output from the element. An output signal x(t) is input to the three filters 202, 203, and 204 having different characteristics. The characteristics of the filters 202, 203, and 204 are respectively given by:

$$y(t) = x(t+2\Delta t) + x(t+\Delta t) - x(t-\Delta t) - x(t-2\Delta t) \qquad (6)$$

$$y(t) = x(t+\Delta t) - x(t) \qquad (7)$$

$$y(t) = x(t) - (x(t+\Delta t) + x(t-\Delta t))/2 \qquad (8)$$

where y(t) is the signal filtered through the filter.

The characteristics of the filter 202 define a differential filter, which does not allow high-frequency components to pass therethrough so much, the characteristics of the filter 203 define a differential filter, and the characteristics of the filter 204 define a filter which allows only the highest frequency components to pass therethrough. The signals filtered through these filters are input to the corresponding autocorrelation coefficient calculators 205. If an input signal is represented by y(t), each autocorrelation coefficient calculator 205 calculates $C_O(\tau)$ according to the following equation (9):

$$C_O(\tau) = \int_0^T y(t) \times y(t+\tau) dt / \int_0^T y(t) \times y(t) dt \qquad (9)$$

The three autocorrelation coefficients calculated from the signals filtered through the three different filters are added to each other by the adder 206. The peak detector 207 calculates the maximum peak position of the sum autocorrelation coefficient, and the focusing position calculator 208 calculates a defocusing amount from the maximum peak position. Then, a lens is moved by the calculated defocusing amount, thus obtaining an in-focus state of an object.

Figure 11A:
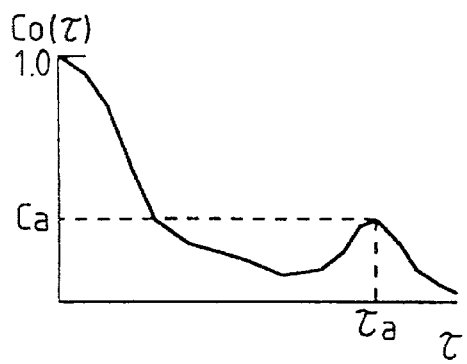
FIGS. 11A to 11D are graphs showing examples of autocorrelation functions.
Figure 11B:
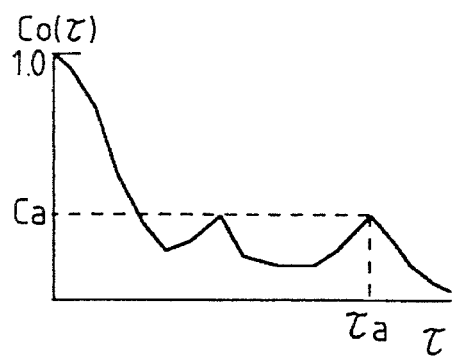
Figure 11D:
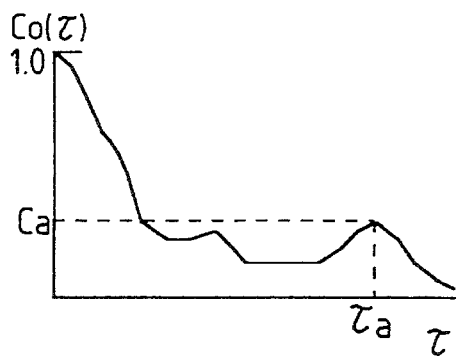
Figure 11C:
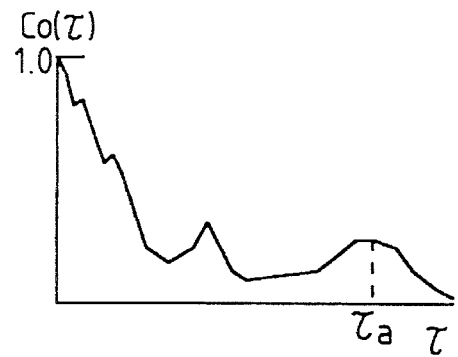
Figure 12A:
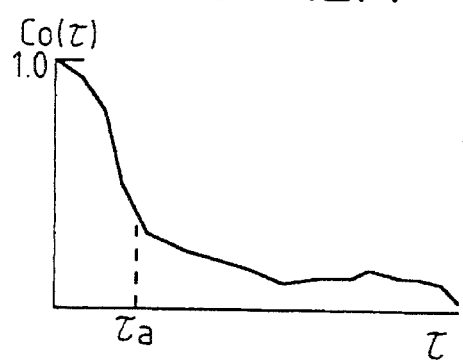
FIGS. 12A to 12D are graphs showing other examples of the autocorrelation functions.
Figure 12B:
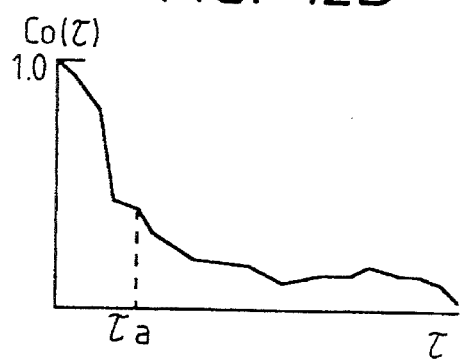
Figure 12D:
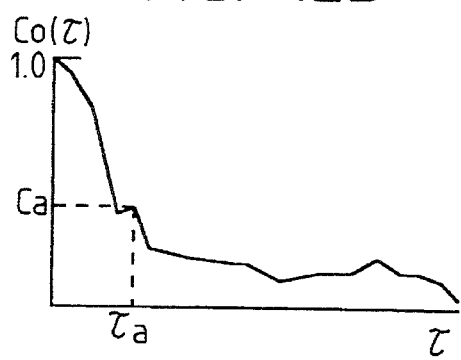
Figure 12C:
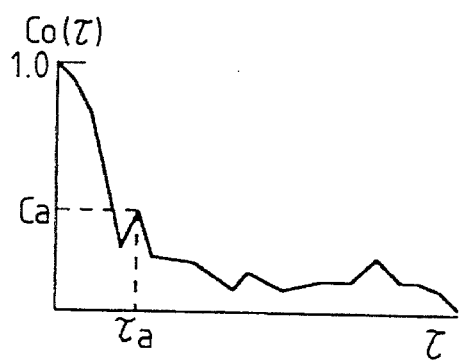

FIGS. 11A to 12D show examples of the autocorrelation coefficient $C_O(\tau)$ calculated using the signals processed by the three different filters. FIGS. 11A to 11D show a case wherein the defocusing amount is large. FIGS. 12A to 12D show a case wherein the defocusing amount is small. FIG. 11A or 12A shows an autocorrelation coefficient of the signal filtered through the filter 202, FIG. 11B or 12B shows an autocorrelation coefficient of the signal filtered through the filter 203, and FIG. 11C or 12C shows an autocorrelation coefficient of the signal filtered through the filter 204. FIG. 11D or 12D shows an additional mean of the three autocorrelation coefficients. τa represents a value of an original peak corresponding to the defocusing amount. The plurality of autocorrelation coefficients calculated from the signals filtered through the plurality of filters having different characteristics are added, and the peak position of the sum autocorrelation coefficient is obtained, thus obtaining accurate in-focus information in any range, as shown in FIGS. 11D and 12D.

In this embodiment, the autocorrelation coefficients calculated from the signals filtered through the filters are simply added, but may be added after they are weighted.

Figure 13:
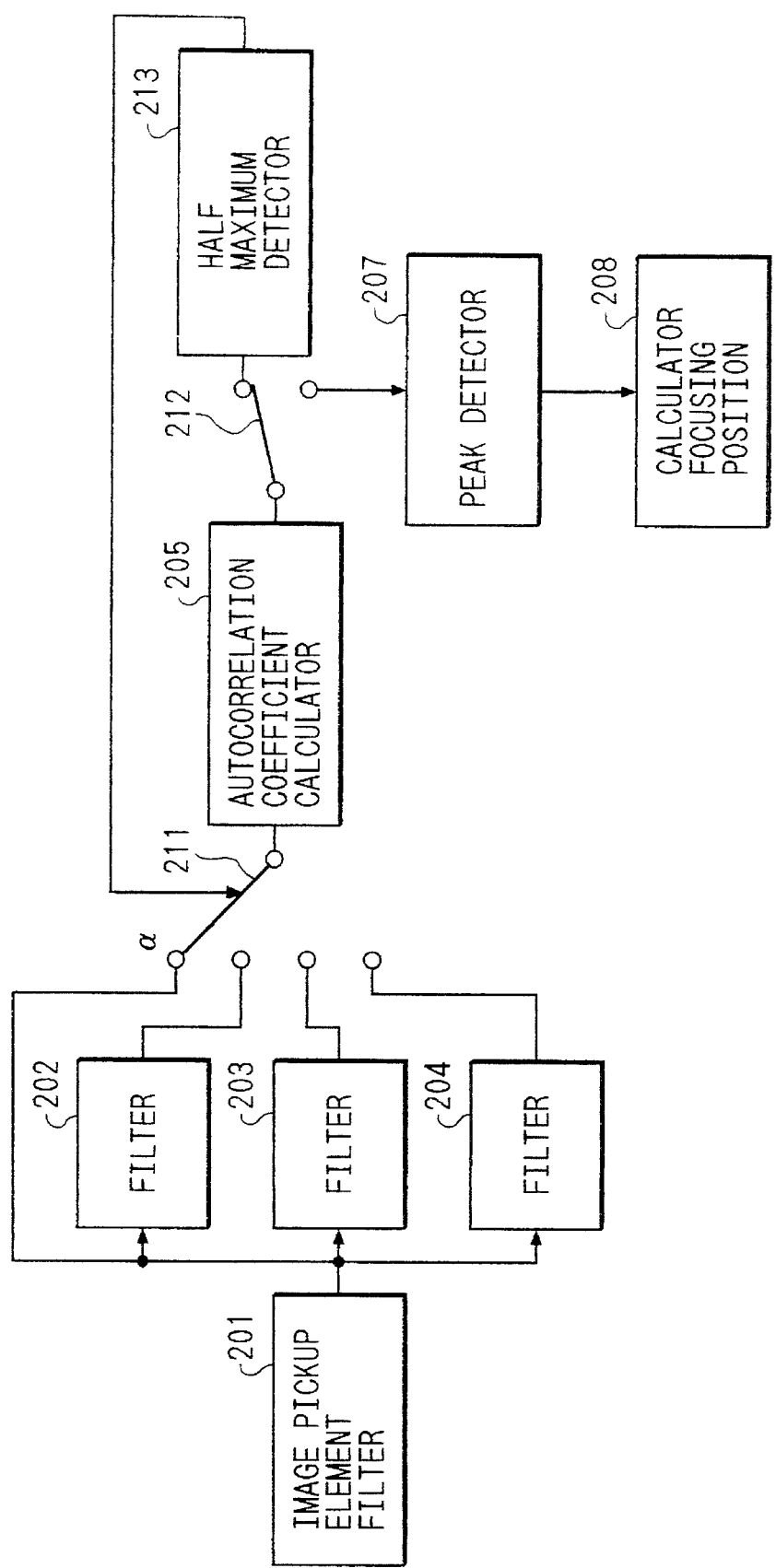
FIG. 13 is an electrical block diagram showing still another embodiment of the present invention.
Figure 14:
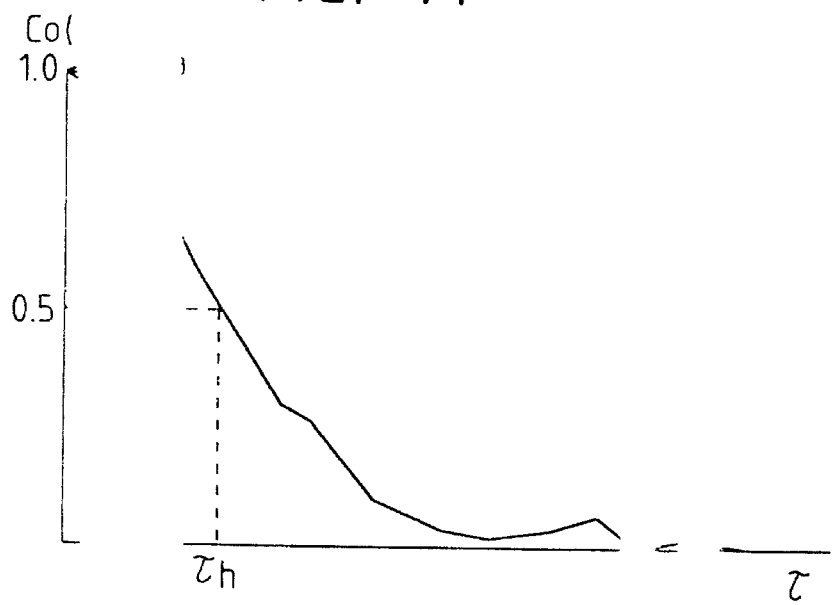
FIG. 14 is a graph showing an example of an autocorrelation function.
Figure 15:
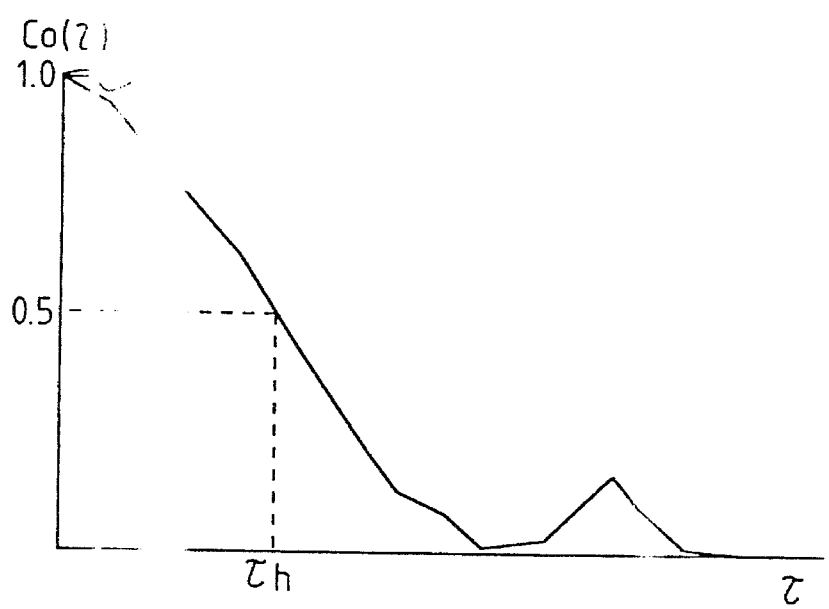
FIG. 15 is a graph showing another example of the autocorrelation function.

FIGS. 13, 14, and 15 show still another embodiment of the present invention.

The same reference numerals in FIG. 13 denote the same parts as in FIG. 10, and a detailed description thereof will be omitted. A switch 211 selects an input signal to the autocorrelation coefficient calculator 205. A switch 212 switches an output destination of the autocorrelation coefficient calculator 205. A half maximum detector 213 detects a half maximum of an autocorrelation coefficient.

Light beams respectively passing through the first and second pupils (FIG. 1) form images on the image pickup element. The object images formed on the image pickup element are converted into electrical signals having the time base as a variable by the image pickup element, and the electrical signals are output from the element. The switch 201 selects a contact α, and hence, an output signal x(t) is input to the autocorrelation coefficient calculator 205. At this time, the switch 212 selects the half maximum detector 213. Therefore, the half maximum detector 213 detects a half maximum τh of a waveform having a peak of τ=1 of the calculated autocorrelation coefficient. The half maximum τh detected by the half maximum detector 213 is as shown in FIGS. 14 and 15. FIG. 14 shows a case wherein the defocusing amount is relatively small, and FIG. 15 shows a case wherein the defocusing amount of relatively large. As the defocusing amount is increased, an image is blurred and a correlation between neighboring pixels becomes strong. Therefore, a correlation near τ=0 becomes large, and the half maximum τh is increased.

The defocusing amount is estimated based on the half maximum τh, and a filter suitable for the estimated defocusing amount is selected by the switch 211. For example, when the half maximum τh is large, the filter 202 is selected. On the other hand, when the half maximum τh is small, the filter 204 is selected. In this manner, when the filters are switched according to the half maximum τh, accurate in-focus information can be obtained in any range. In this embodiment, the filter is selected according to the half maximum τh of the autocorrelation coefficient. Alternatively, the filter may be selected according to, e.g., the magnitude of a high-frequency component of the output signal from the image pickup element.

FIGS. 16 to 20 show still another embodiment of the present invention.

Figure 16:
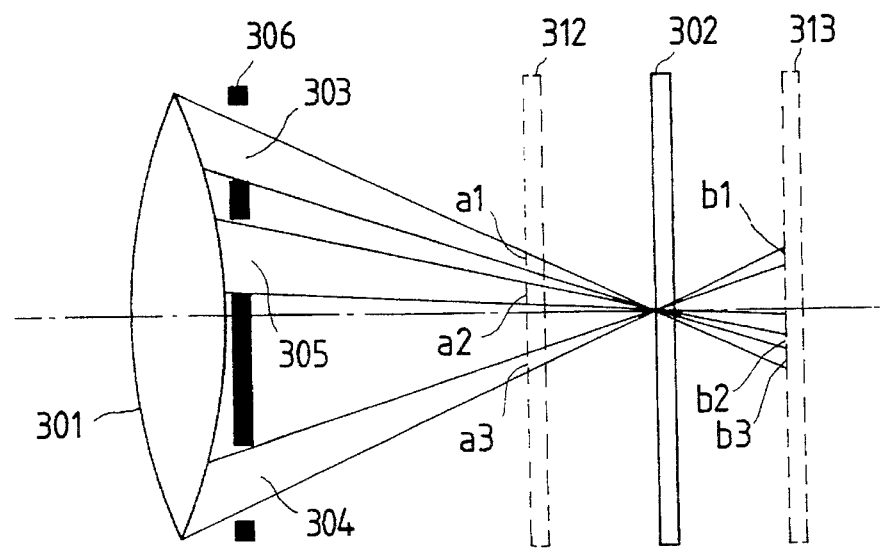
FIG. 16 is an optical sectional view showing still another embodiment of the present invention.

A system shown in FIG. 16 includes a photographing lens 301 and an image pickup element 302 such as a CCD. A light-shielding plate 306 has first, second, and third pupils at positions 303, 304, and 305. The image pickup element is located at a position 312 when it is set in a far-focus state, and is located at a position 313 when it is set in a near-focus state.

Figure 17:
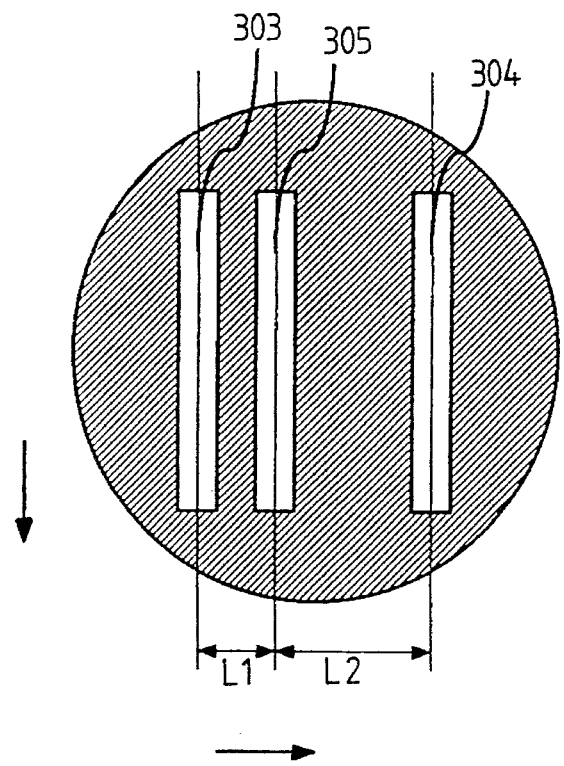
FIG. 17 is a plan view showing a mask having a plurality of apertures.

In FIG. 16, when the image pickup element 302 is located at a position indicated by a solid line, since it is set in an in-focus state, light beams respectively passing through the first, second, and third pupils form images at the same position on the image pickup element. In a far-focus state, since the image pickup element is located at the position 312, light beams respectively passing through the first, second, and third pupils form slightly blurred images at positions a1, a3, and a2 on the image pickup element, respectively. In a near-focus state, since the image pickup element is located at the position 313, light beams respectively passing through the first, second, and third pupils form slightly blurred images at positions b3, b1, and b2 on the image pickup element, respectively. FIG. 17 is a view when the light-shielding plate 306 is viewed from the object side. In FIG. 17, L1 and L2 respectively represent the intervals between the first and third pupil positions and between the second and third pupil positions, and satisfy L1<L2.

Figures 18, 19:
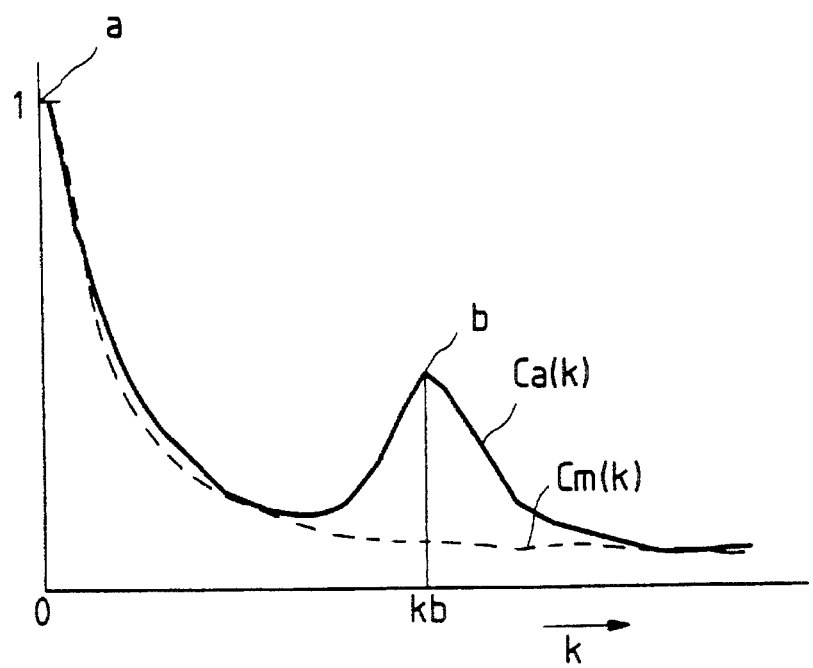
FIG. 18 is a view showing coordinates set on an image pickup element.
FIG. 19 is a graph showing an example of an autocorrelation function.

When an original signal is represented by f(t), and its autocorrelation function is represented by C(τ), the autocorrelation function C(τ) is normally expressed by:

$$C(\tau) = 1/T \int_0^T f(t) \cdot f(t+\tau) dt$$

where T is the correlation calculation range. Since a real calculation is performed for discrete data output from the image pickup element, the original signal f(τ) can be expressed by x(i,j) using coordinates on the image pickup element (where i is the horizontal coordinate, and j is the vertical coordinate). When x(i,j) is used, the autocorrelation function C(m,n) is given by:

$$C(m,n) = \frac{1}{I \times J} \sum_{i=1}^{I} \sum_{j=1}^{J} x(i,j) \times x(i+m, j+n) \quad (10)$$

where I is the correlation calculation range in the horizontal direction, and J is the correlation calculation range in the vertical direction. FIG. 18 shows the relationship between x(i,j) and x(i+m,j+n).

Equation (10) represents a correlation between two points, i.e., a quadratic correlation function. In the case of a correlation among three points, the function is given by:

$$C(m,n,p,q) = \frac{1}{I \times J} \sum_{i=1}^{I} \sum_{j=1}^{J} x(i,j) \times \quad (11)$$

$$x(i+m, j+n) \cdot x(i+p, j+q)$$

In equation (11), if m, n, p, and q satisfy a predetermined relation, and are expressed as a function of k, C(m,n,p,q) can be expressed as a function C(k) of one variable.

In this embodiment, an autocorrelation among the three points is calculated from the output signals from the image pickup element 302, and in-focus information is obtained from the peak position of the calculated autocorrelation. For this purpose, autocorrelation functions Ca(k) and Cm(k) are calculated using the following equations (12) and (13):

$$Cm(k) = \frac{1}{A} \sum_{i=1}^{I} \sum_{j=1}^{J} x(i,j) \times x(i + L1 \times k, j) \times x(i - L2 \times k, j) \quad (12)$$

$$Ca(k) = \frac{1}{A} \sum_{i=1}^{I} \sum_{j=1}^{J} x(i,j) \times x(i - L1 \times k, j) \times x(i + L2 \times k, j) \quad (13)$$

$$\text{For } A = \sum_{i=1}^{I} \sum_{j=1}^{J} x(i,j)^3$$

Equations (12) and (13) are normalized to have a maximum value "1" when k=0.

Figure 20:
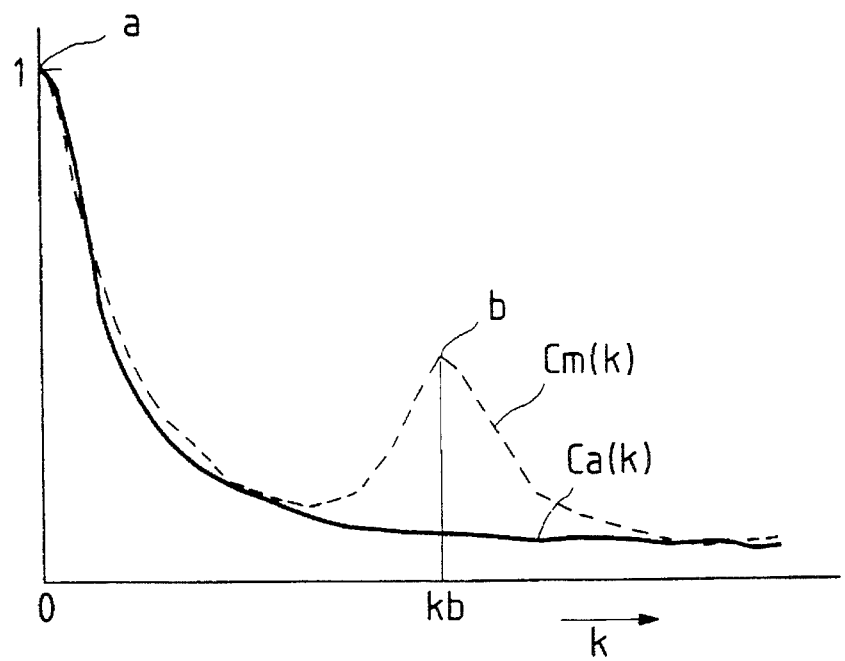
FIG. 20 is a graph showing another example of the autocorrelation function.

FIGS. 19 and 20 show examples of the autocorrelation functions Ca(k) and Cm(k). FIG. 19 shows an example of the autocorrelation functions Ca(k) and Cm(k) in a far-focus state, and FIG. 20 shows an example of the autocorrelation functions Ca(k) and Cm(k) in a near-focus state.

Since FIG. 19 shows the far-focus state, the ratio of the interval between a1 and a2 to the interval between a2 and a3 is L1: L2, as is apparent from FIGS. 16 and 17. Therefore, the autocorrelation function Ca(k) has two peaks a and b, and the autocorrelation function Cm(k) has one peak a. More specifically, in the far-focus state, Ca(k)>Cm(k) is satisfied near the peak b. Similarly, since FIG. 20 shows the near-focus state, the ratio of the interval between b1 and b2 to the interval between b2 and b3 is L2:L1, as is apparent from FIGS. 16 and 17. Therefore, the autocorrelation function Cm(k) has two peaks a and b, and the autocorrelation function Ca(k) has one peak a. More specifically, in the near-focus state, Ca(k)<Cm(k) is satisfied near the peak b. In each of FIGS. 19 and 20, the peak b indicates a strong correlation at a pixel distance D of the image pickup element corresponding to kb, and the pixel distance D corresponds to the defocusing amount. Therefore, when this distance is converted by, e.g., the f-number of the lens, the defocusing amount can be determined. Furthermore, when the relationship between the autocorrelation functions Ca(k) and Cm(k) is checked near the peak b, the direction of the focusing position can be determined.

Still another embodiment of the present invention will be described below. The arrangement of the image pickup element and the like, and the light-shielding plate 306 are the same as those in the above embodiment, and a detailed description thereof will be omitted. In this embodiment, an autocorrelation between two points is calculated from the output signals from the image pickup element, and the defocusing amount is determined based on the peak position of the calculated autocorrelation. For this purpose, an autocorrelation function Cr(k) is calculated using the following equation (14):

$$Cr(k) = \frac{1}{A} \sum_{i=1}^{I} \sum_{j=1}^{J} x(i,j) \times x(i + k, j) \quad (14)$$

$$\text{For } A = \sum_{i=1}^{I} \sum_{j=1}^{J} x(i,j)^2$$

Equation (14) is normalized to have a maximum value "1" when k=1.

Figure 21:
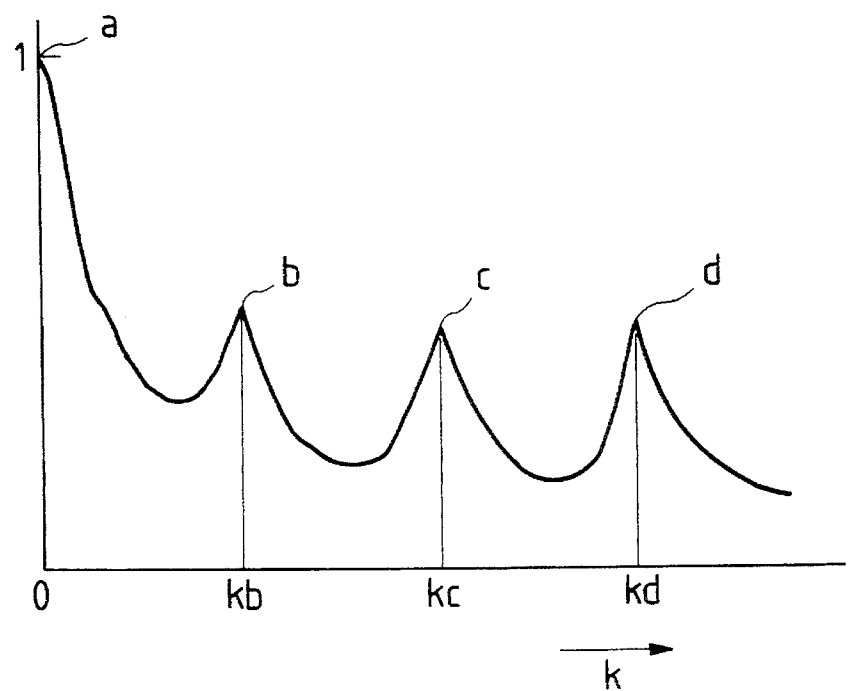
FIG. 21 is a graph showing still another example of the autocorrelation function.

FIG. 21 shows an example of the autocorrelation function Cr(k). FIG. 21 shows the autocorrelation function Cr(k) in an out-of-focus state. As can be seen from FIGS. 16 and 17, the autocorrelation function Cr(k) has four peaks a, b, c, and d. If the peak k assumes values O, kb, kc, and kd, kb: kd−kb=L1:L2, and kc:kd−kc=L2:L1 are satisfied. The pixel distance D of the image pickup element corresponding to this peak position is obtained, and is converted by the f-number of the lens, thus determining the defocusing amount. Furthermore, a value k=d corresponding to the pixel distance D of the image pickup element is substituted in equations (12) and (13) to calculate autocorrelation function values Ca(d) and Cm(d), and the relationship between these values is checked, thus determining the defocusing direction of the focusing position.

Furthermore, when the ratio L1:L2 of the interval between the first and third pupil positions to the interval between the second and third pupil positions is selected so that L2 does not become an integer multiple of L1 (e.g., 2:3), an in-focus state can be accurately attained even when an object has a cyclic pattern.

In the arrangement shown in FIGS. 16 and 17, the light-shielding plate 306 is arranged to perform in-focus detection using a correlation, in the horizontal direction, of the signals from the image pickup element. Alternatively, in-focus detection may be performed based on a correlation in the vertical direction using a light-shielding plate rotated through 90°.

Figure 22:
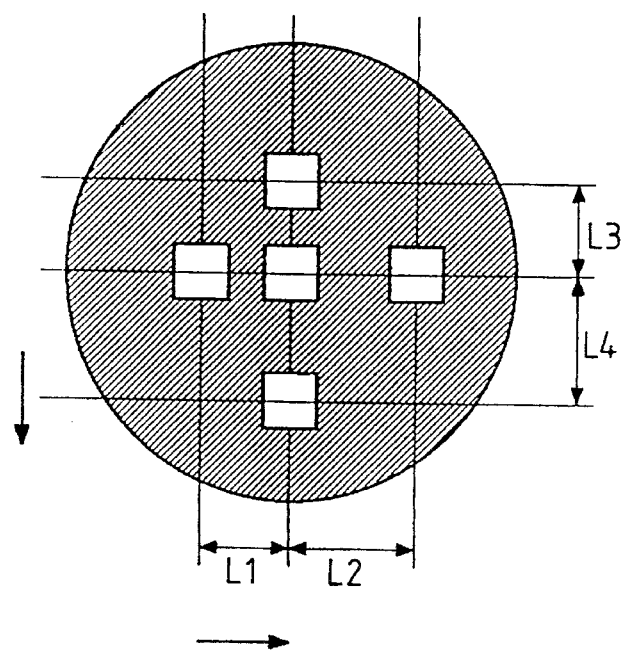
FIG. 22 is a plan view showing a mask having another aperture arrangement.
Figure 23:
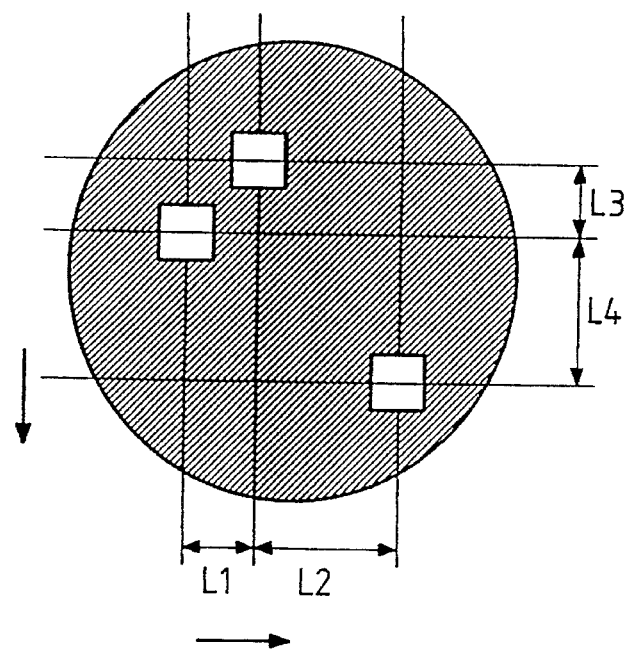
FIG. 23 is a plan view showing a mask having still another aperture arrangement.

As other embodiments, a light-shielding plate shown in FIG. 22 or 23 may be used, and in-focus information may be obtained using both the vertical and horizontal correlations or by selectively using either one correlation depending on an object.

In the above embodiments of the present invention, the focusing position is detected directly using the output signals from the image pickup element. Alternatively, a calculation may be performed after the output signals are filtered through filters for obtaining a difference between the outputs of neighboring pixels or a high-pass filter such as a differential filter.

Figure 24:
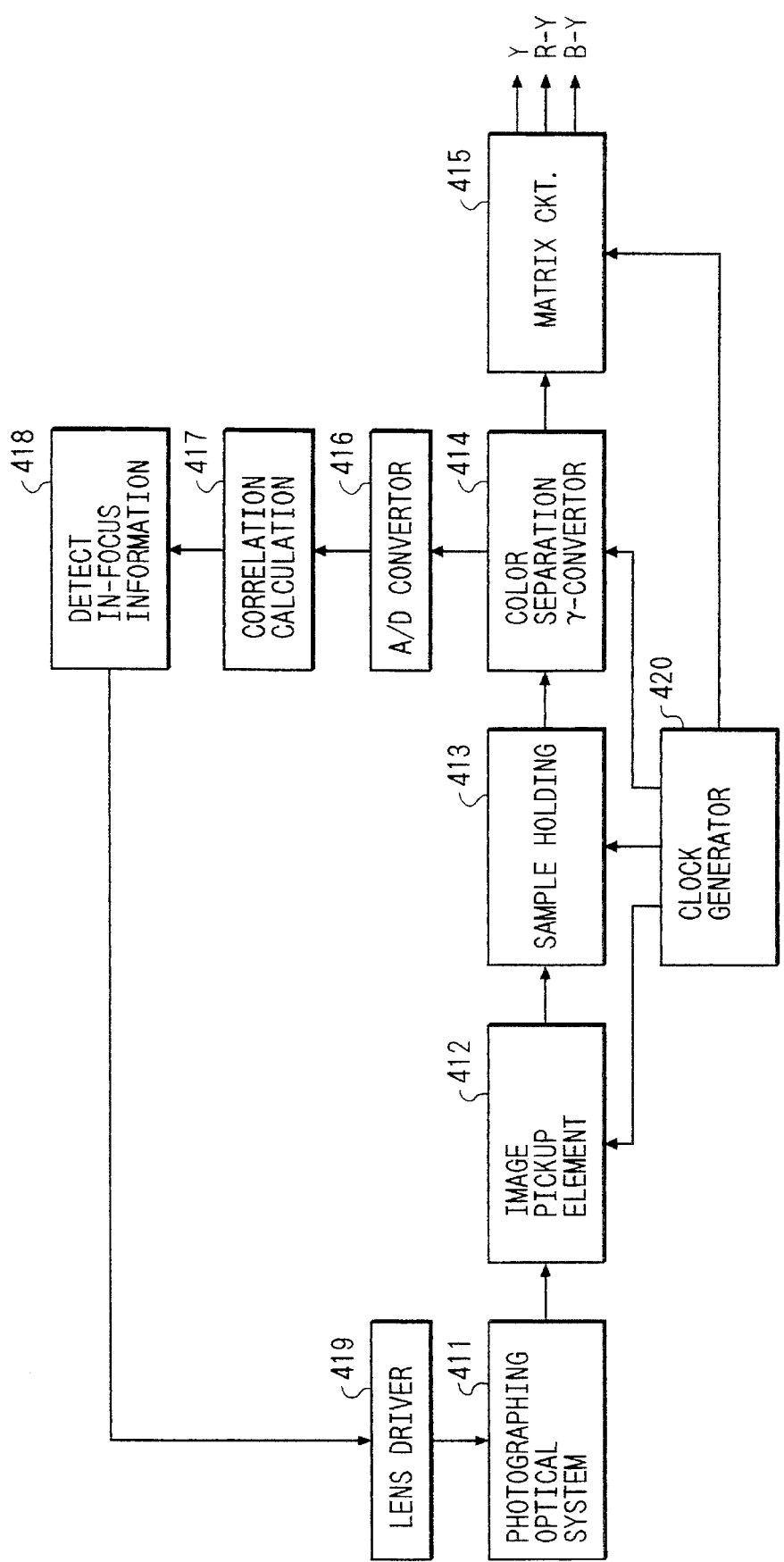
FIG. 24 is an electrical block diagram showing still another embodiment of the present invention.

FIG. 24 is a block diagram showing still another embodiment of the present invention. An apparatus shown in FIG. 24 includes a photographing optical system 411 comprising a photographing lens, a light-shielding plate, and the like, an image pickup element 412 for converting an image into an electrical signal, a sample & holding circuit 413, a color separation & γ conversion circuit 414, a matrix circuit 415 for obtaining a luminance output and color difference outputs, an A/D converter 416 for converting an analog signal into a digital signal, a correlation calculation processing block 417 for performing an autocorrelation calculation, an in-focus information detection block 418 for detecting in-focus information based on a correlation calculation result, a lens driver 419, and a clock generator 420 for supplying clocks to the respective blocks.

In FIG. 24, image light transmitted through the photographing optical system 411 forms an image on the image pickup element 412. Image information obtained by converting the image into an electrical signal by the image pickup element is sampled and held by the sample & holding circuit 413, and is then converted into three primary colors, i.e., R, G, and B signals by the color separation & γ conversion circuit 414. These R, G, and B outputs are converted into a luminance signal and color difference signals by the matrix circuit 415, and the converted signals are output from the matrix circuit 415. On the other hand, a green (G) signal output from the color separation & γ conversion circuit 414 is converted by the A/D converter 416 into digital data. The digital data is supplied to the correlation calculation block 417 to calculate an autocorrelation function. The in-focus information detection block 418 obtains distance information of an object on the basis of the calculation result of the block 417. The lens driver 419 moves the photographing optical system to an in-focus position on the basis of the distance information of the object obtained by the block 418.

The operation and processing of the photographing optical system, the correlation calculation block, and the in-focus information detection block will be described in detail below.

Figure 25:
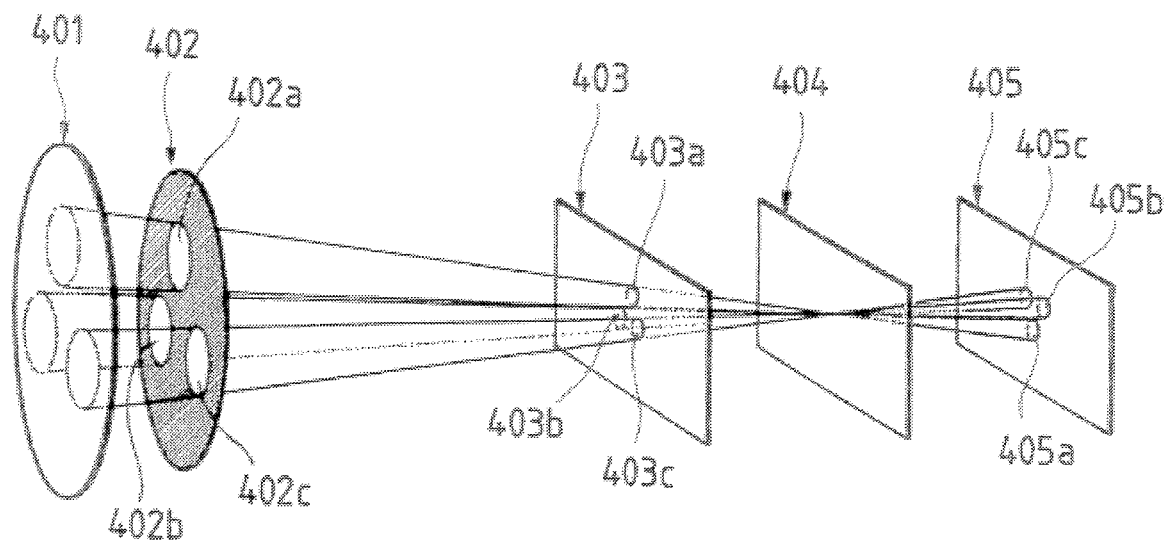
FIG. 25 is a perspective view of an optical system.

FIG. 25 shows the relationship between the photographing optical system and a sensor (image pickup element). A system shown in FIG. 25 includes a photographing lens 401, and a light-shielding plate 402 having a plurality of apertures. In a far-focus state, the image pickup element is located at a position 403. In an in-focus state, the image pickup element is located at a position 404. In a near-focus state, the image pickup element is located at a position 405. The light shielding plate 402 has three apertures 402a, 402b, and 402c, and light beams passing through these apertures form images on the image pickup element. When the image pickup element is located at the position 403, light beams respectively passing through the apertures 402a, 402b, and 402c are converged at positions 403a, 403b, and 403c, respectively. When the image pickup element is located at the in-focus position, three light beams from a point object form images at one point. When the image pickup element is located at the position 405, light beams respectively passing through the apertures 402a, 402b, and 402c become incident at positions 405a, 405b, and 405c, respectively.

Figure 26:
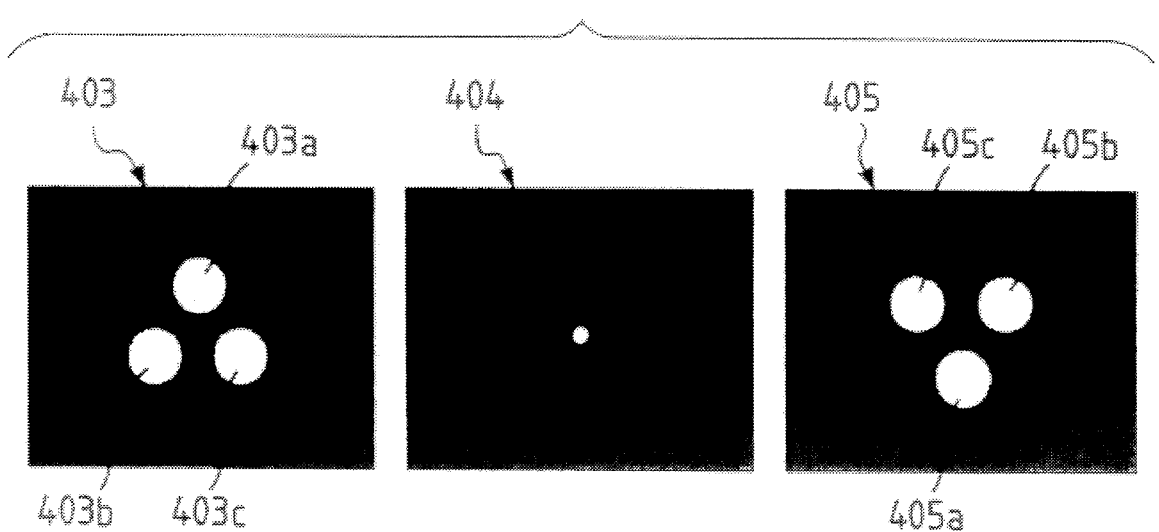
FIG. 26 is a view showing optical images.

FIG. 26 shows image states on the corresponding image formation planes. In FIG. 26, 403, 404, and 405 respectively indicate images on the image pickup element at the positions 403, 404, and 405 in FIG. 25. As is apparent from FIG. 26, the images 403 and 405 formed by light beams passing through the apertures 402a, 402b, and 402c are point symmetrical with each other. Therefore, if the direction of images on the image pickup element is the same as that of the light-shielding plate, a far-focus state can be determined; if the direction of images is rotated through 180° from the that of the light-shielding plate, a near-focus state can be determined.

The processing of the correlation calculation block 417 in FIG. 24 will be described below with reference to FIGS. 27A to 27C.

Figure 27A:
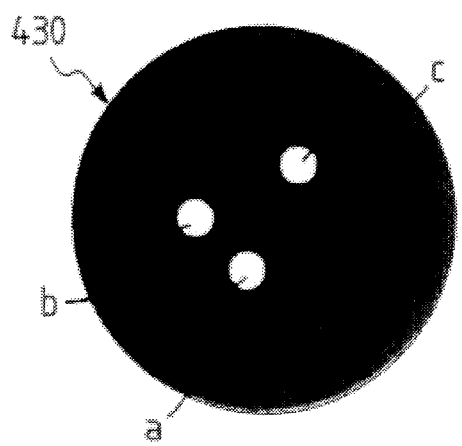
FIG. 27A is a plan view of a mask.
Figure 27B:
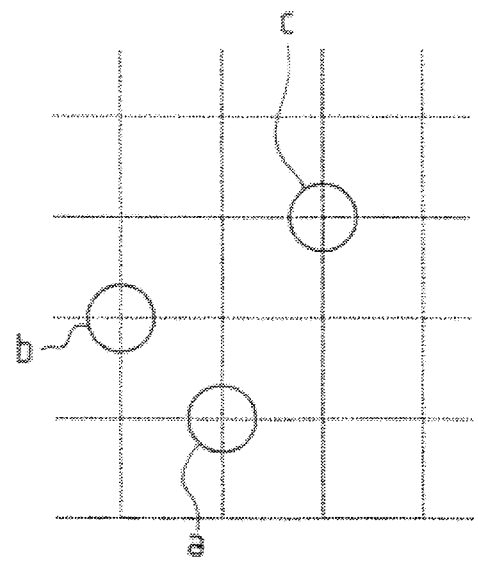
FIG. 27B is a view showing apertures on coordinates.
Figure 27C:
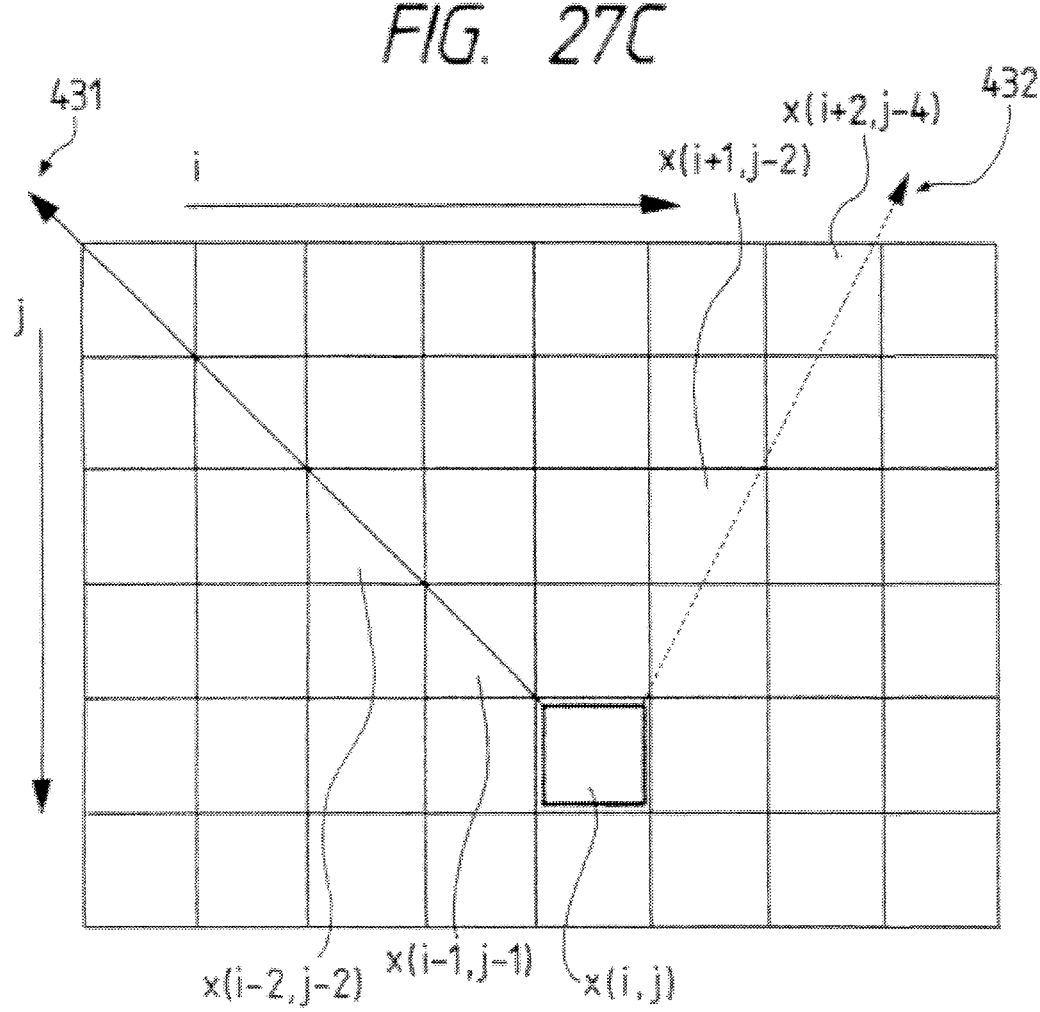
FIG. 27C is a view showing the positional relationship of pixels on an image pickup element for performing a calculation.

FIG. 27A shows the shape of the light-shielding plate, FIG. 27B shows the positional relationship among the apertures, and FIG. 27C shows the positional relationship among pixels on the image pickup element for a calculation. As shown in FIG. 27A, three holes (apertures) a, b, and C are formed in a light-shielding plate 430. The three apertures have the positional relationship, as shown in, e.g., FIG. 27B. The three apertures are aligned at equal intervals in the order of b, a, and c from the left side in the horizontal direction. In the vertical direction, the apertures are also aligned at equal intervals in the order of c, b, and a from above. In FIG. 27B, assume that horizontal and vertical pitches of boxes are equal to each other.

When the apertures have the above-mentioned positional relationship, images with respect to a point light source become images similar to the apertures and having the same direction when viewed from the object side in the far-focus state. In the near-focus state, images with respect to the point light source become images similar to the apertures and rotated through 180° when viewed from the object side.

In general, since an image can be regarded as a superposed image of an infinite number of point light sources having different brightnesses, images on the image pickup element also correspond to superposed images of those similar to the apertures on the light-shielding plate. Therefore, in a state other than the in-focus state, a correlation among pixels having the above-mentioned positional relationship becomes strong. In proportion to the defocusing amount, the size of blurred images changes while maintaining the similarity relationship with that of the apertures. Therefore, when a correlation between the images of the apertures b and c is calculated with reference to the image of the aperture a, the following calculation can be performed. As shown in FIG. 27C, if the horizontal coordinate of a pixel is represented by i, and the vertical coordinate of the pixel is represented by j, the image corresponding to the aperture b is present on an extended line of an arrow 431 with respect to a reference point x(i,j), and the image corresponding to the aperture b is present on an extended line of an arrow 432 with respect to the reference point x(i,j) (in the far-focus state, the image is present in front of the arrow; in the near-focus state, the image is present behind the arrow). Therefore, an autocorrelation between pixels on the extending lines of the arrows 431 and 432 with respect to a reference pixel need only be calculated.

$$C(n,m) = \sum_{n=0}^{N} \sum_{m=0}^{M} x(i,j) \times x(i-n, j-n) \times x(i+m, j-2m) \quad (15)$$

Figure 28A:
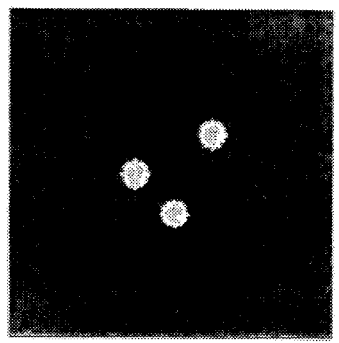
FIG. 28A is a view showing a blurred image in a far-focus state.
Figure 28B:
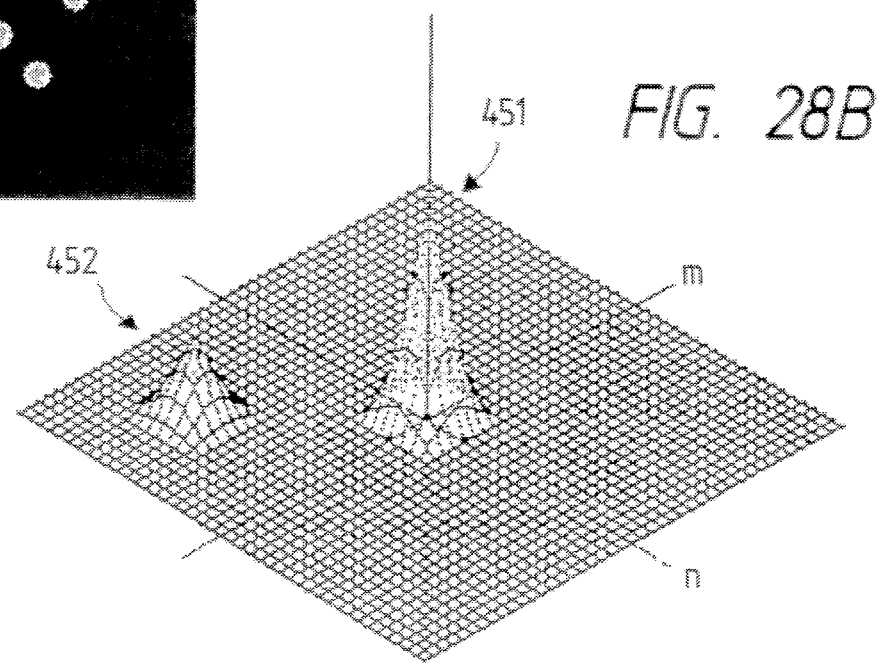
FIG. 28B is a chart showing a correlation calculation result.
Figure 28C:
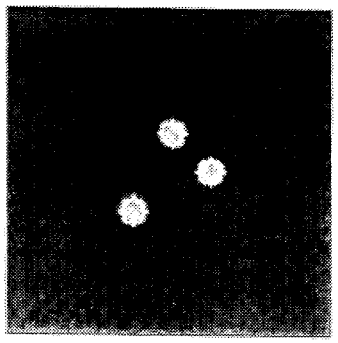
FIG. 28C is a view showing a blurred image in a near-focus state.
Figure 28D:
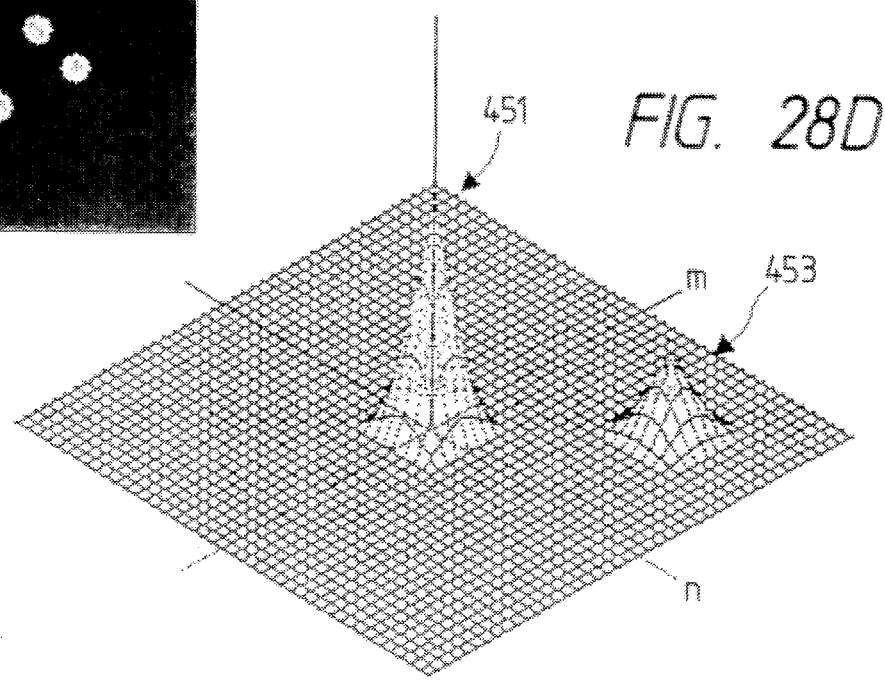
FIG. 28D is a chart showing a correlation calculation result.
Figure 29A:
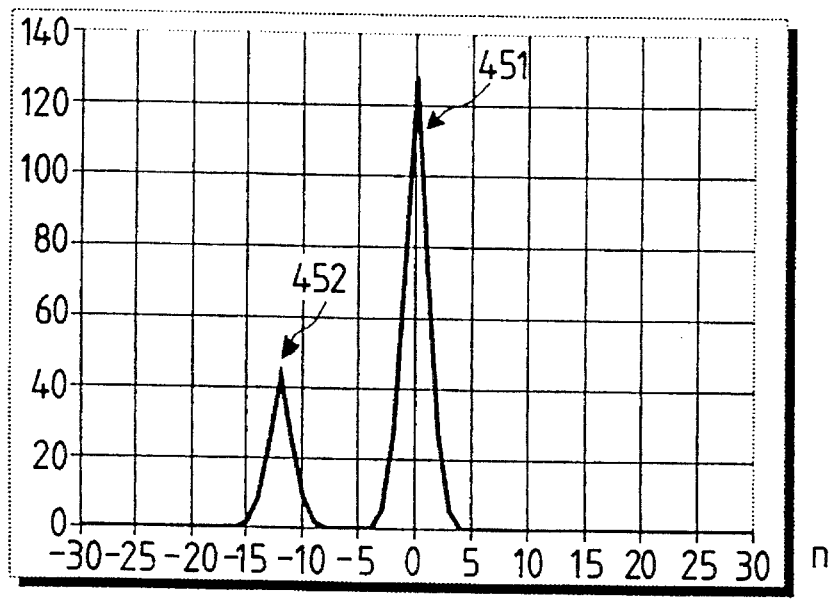
FIGS. 29A and 29B are graphs showing correlation calculation results.
Figure 29B:
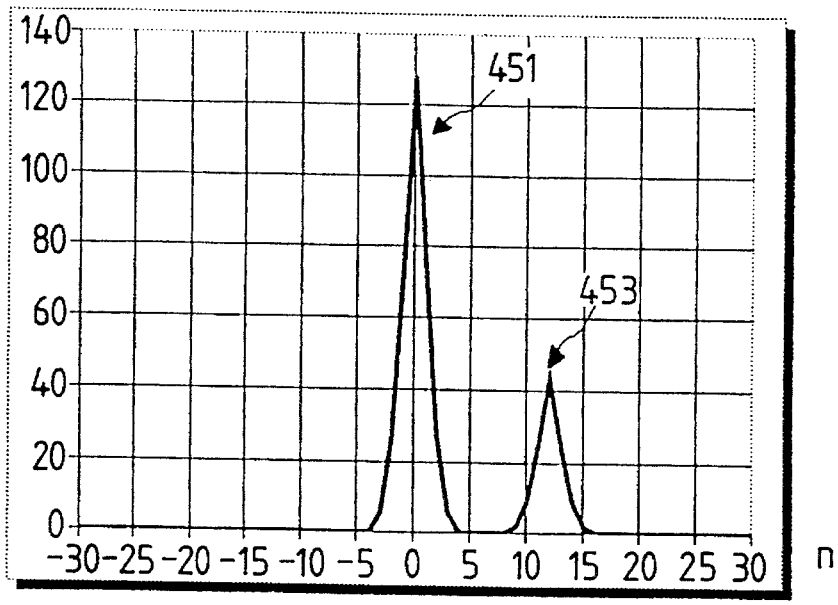

Equation (15) is the calculation formula of the autocorrelation. FIGS. 28A to 28D show the autocorrelation C(n,m) calculated based on equation (15). FIGS. 28A to 28D show calculation results of correlations of blurred images with respect to a point light source. FIG. 28A shows blurred images in the far-focus state, and FIG. 28B shows the correlation calculation result of the images shown in FIG. 28A. FIG. 28C shows blurred images in the near-focus state, and FIG. 28D shows the correlation calculation result of the images shown in FIG. 28C. In each of FIGS. 28B and 28D, a peak 451 appearing at the center corresponds to the origin (m=0 and n=0), and appears independently of the defocusing amount. In addition to the central peak, a peak 452 having both n and m in a negative area appears in FIG. 28B, and a peak 453 having both n and m in a positive area appears in FIG. 28D. In this manner, peaks appear in different areas in the near- and far-focus states, respectively. The distance between the peak 452 or 453 and the origin corresponds to the defocusing amount. If blurred patterns, i.e., the shapes of the apertures, are known in advance, since the relationship between n and m can be uniquely determined, a correlation can be expressed by either variable. In this case, since it is known that a peak appears on a line of m=n, a calculation need only be performed for pixels on the line of m=n. FIGS. 29A and 29B show values on the line of m=n. FIG. 29A corresponds to FIG. 28B, and FIG. 29B corresponds to FIG. 28D. As for peaks 451, 452, and 453, the peaks denoted by the same reference numerals in FIGS. 28B and 28D and FIGS. 29A and 28B correspond to each other.

FIGS. 28A to 29B have exemplified a case of the point light source. A case other than the point light source will be explained below with reference to FIGS. 30A to 30E.

Figure 30A:
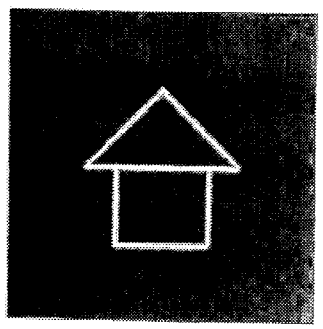
FIG. 30A is a view showing an image in an in-focus state.
Figure 30B:
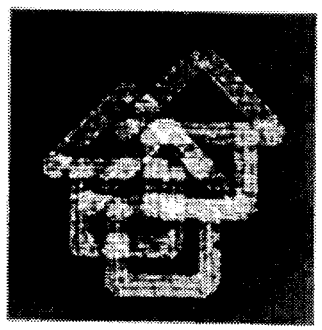
FIG. 30B is a view showing an image in a far-focus state.
Figure 30C:
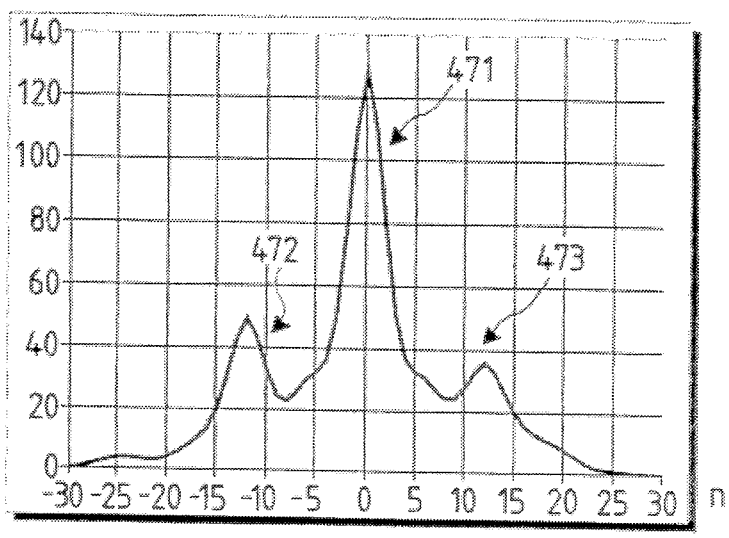
FIG. 30C is a graph showing a correlation calculation result.
Figure 30D:
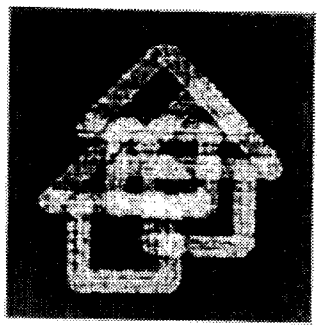
FIG. 30D is a view showing an image in a near-focus state.
Figure 30E:
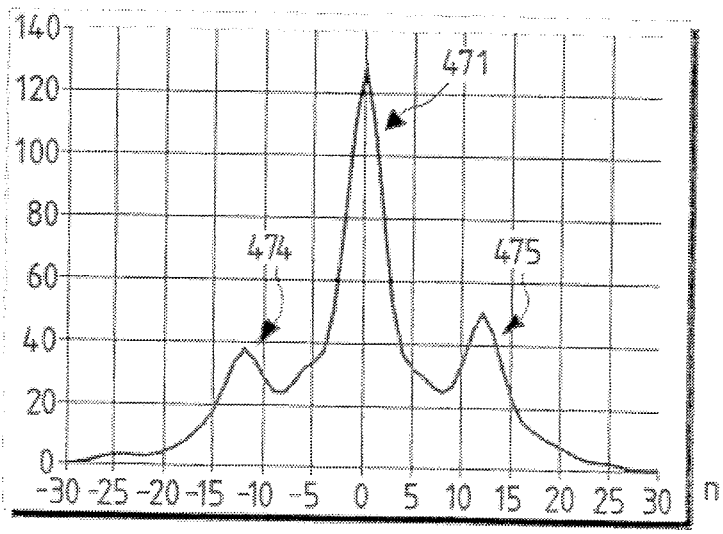
FIG. 30E is a graph showing a correlation calculation result.

FIG. 30A shows an image in an in-focus state, FIG. 30B shows an image in a far-focus state, and FIG. 30D shows an image in a near-focus state. FIGS. 30C and 30E respectively show correlation calculation results for the images shown in FIGS. 30B and 30D like in FIGS. 29A and 29B. In FIG. 30C, two peaks 472 and 473 are generated in addition to a peak 471 corresponding to the origin. In FIG. 30E, two peaks 474 and 475 are generated in addition to the peak 471 corresponding to the origin. In FIG. 30C, n of the negative-side peak 472 is higher than that of the peak 473. Conversely, in FIG. 30E, n of the positive-side peak 475 is higher than that of the peak 474. In this manner, in the case other than the point light source, the defocusing amount and direction can be determined by obtaining a maximum point other than the origin.

The in-focus information detection block 418 (FIG. 24) obtains peak positions excluding that corresponding to the origin from the autocorrelation functions calculated in this manner, and obtains the value of the variable n corresponding to the maximum peak. Since the value n is proportional to the defocusing amount, the lens moving amount necessary for attaining an in-focus state is determined from the value n, and data indicating the moving amount is supplied to the lens driver.

Another embodiment of a calculation method executed by the correlation calculation block 417 will be described below with reference to FIG. 31 and FIGS. 32A and 32B.

FIG. 31 shows coefficients of a digital filter.

When the light-shielding member 430 shown in FIG. 27A is used, the output signals from the image pickup element are filtered through the digital filter shown in FIG. 31, and thereafter, a correlation calculation is performed in the same manner as in the embodiment shown in FIG. 24. If an output signal from the image pickup element is represented by x(t), and a filtered signal is represented by y(t), since this digital filter is a high-pass filter, y(t) assumes either a positive or negative value. Since a correlation calculation need only be performed for signals having the same polarity, the calculation is performed using signals y(t) having the same sign. Furthermore, when the signal y(t) assumes a negative value, the absolute value of the calculation result can be used to obtain a clearer peak of the correlation. FIGS. 32A and 32B show the calculation results obtained as described above. The same image data as in FIGS. 30B and 30D are used in the calculation. More specifically, the calculation result shown in FIG. 32A is obtained from data in FIG. 30B, i.e., in the far-focus state, and the calculation result shown in FIG. 32B is obtained from data shown in FIG. 30D, i.e., in the near-focus state.

As is apparent from the comparison between FIGS. 32A and 32B and FIGS. 30B and 30D, when the digital filter shown in FIG. 31 is used, the peak of the correlation calculation result becomes sharp, and can be easily discriminated. In FIG. 30C, the first peak 471 corresponding to the largest correlation, the second peak 472 corresponding to the second largest correlation, and the third peak 473 corresponding to the third largest correlation appear. Of these peaks, the second and third peaks are compared to determine a near- or far-focus state. However, in FIG. 32A, first and second peaks 491 and 492 clearly appear, while a third peak does not appear clearly. Therefore, discrimination of the near- or far-focus state is facilitated. Similarly, in FIG. 30E, of the peaks 471, 474, and 475, the second and third peaks are compared to determine the near- or far-focus state. Contrary to this, in FIG. 32B, first and second peaks 491 and 495 appear clearly, but a third peak does not appear clearly. Therefore, since the peak 495 appears at the positive side, a near-focus state can be easily determined. When the filter is used like in this embodiment, sharp peaks appear. For this reason, even when a correlation peak is present near the origin, it can be easily detected.

Modifications of the digital filter used in the above embodiment will be described below with reference to FIGS. 33A to 35B.

In the coefficient matrix of the digital filter of this modification, a coefficient of the central pixel is set to be "4", coefficients shifted from the central pixel by n pixels in the horizontal and vertical directions are set to be "−1", and other coefficients are set to be "0". FIGS. 33A to 33C show the coefficients when n=1, n=2, and n=3. FIG. 33A shows a matrix when n=1, FIG. 33B shows a matrix when n=2, and FIG. 33C shows a matrix when n=4. Similarly, when n is larger than 4, coefficients at positions shifted from the central pixel by n pixels are set to be "−1". When n=0, since five coefficients overlap each other, and 4-1-1-1-1=0, all coefficients are set to be "0". The value n is the same as the variable n for a correlation calculation used in the embodiment shown in FIG. 24, and the digital filter changes according to a change in variable for the correlation calculation.

When the correlation calculation is performed after signals are filtered through the digital filter of this modification, the results shown in FIGS. 34A to 35B are obtained.

Figure 34A:
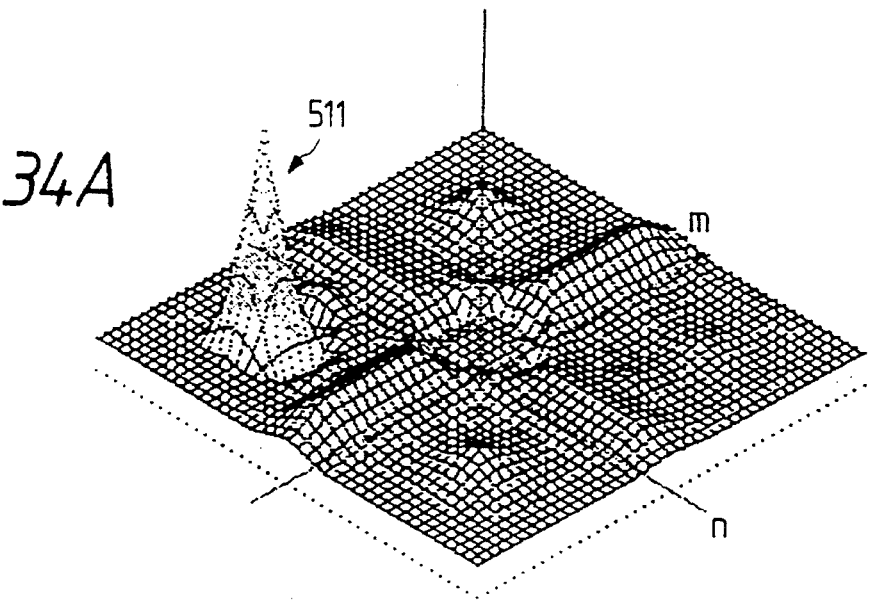
FIGS. 34A and 34B are charts showing correlation calculation results.
Figure 34B:
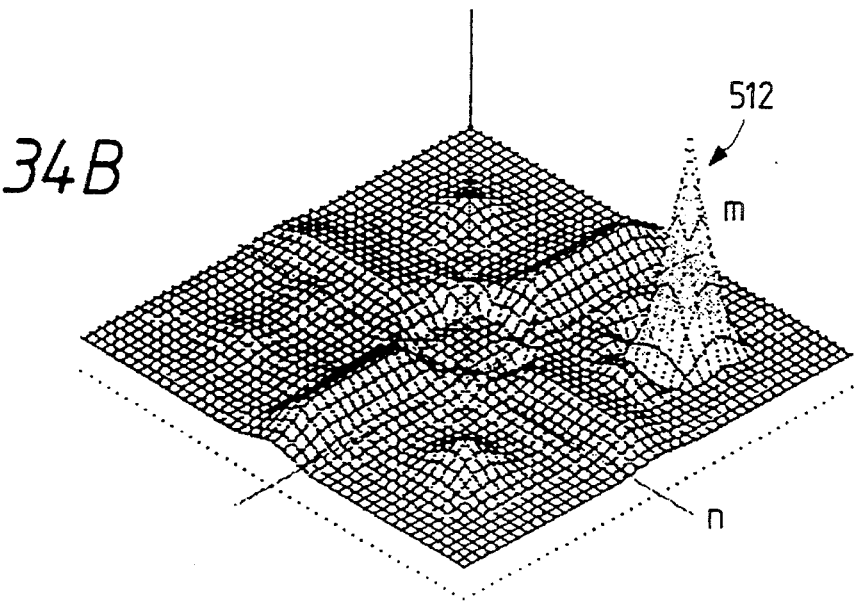

FIGS. 34A and 34B respectively show the processing results of the data shown in FIGS. 28A and 28C. Upon comparison with the calculation results shown in FIGS. 28B and 28D obtained without using the filter, the calculation results shown in FIGS. 34A and 34B have no peaks corresponding to the peak 451 at the position of n=1. In FIGS. 34A and 34B, peaks at positions 511 and 512 corresponding to the peaks 452 and 453 in FIGS. 28B and 28D have maximum values. In this manner, since no peak appears near the origin, a correlation peak generated due to an out-of-focus state can be easily detected.

Figure 35A:
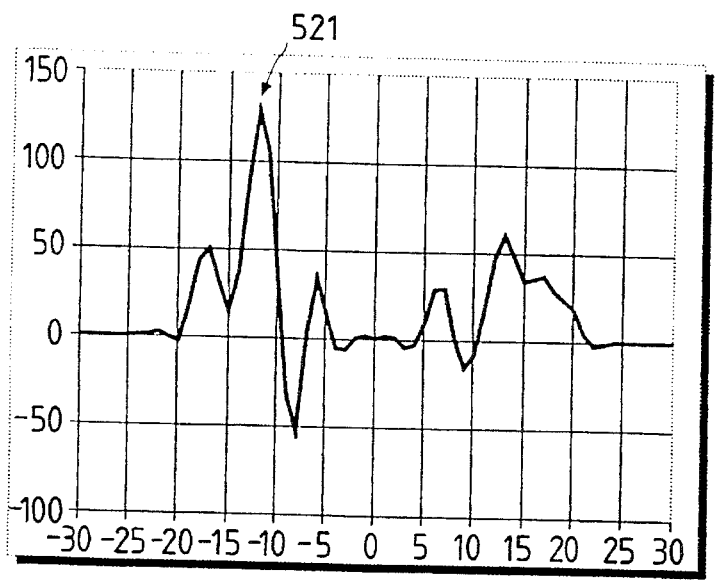
FIGS. 35A and 35B are graphs showing correlation calculation results.
Figure 35B:
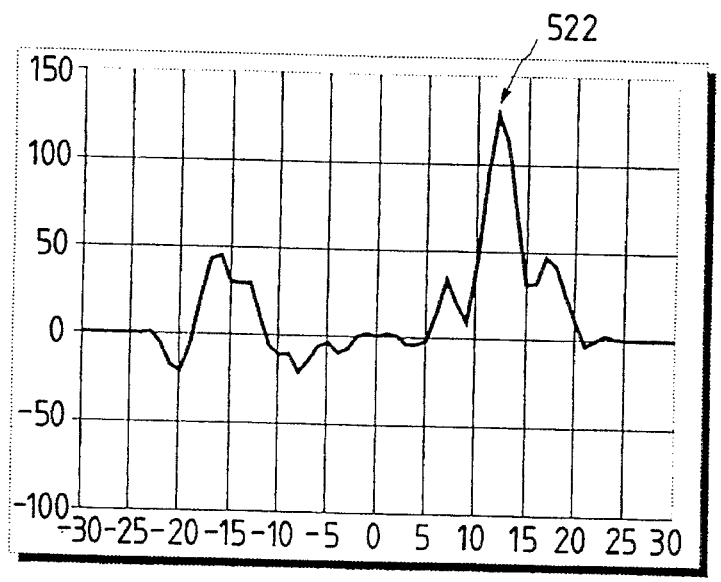
Figure 36:
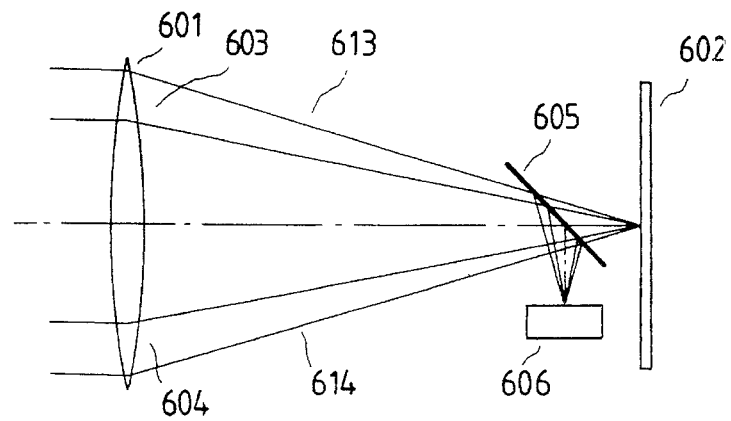
FIG. 36 is a view showing a conventional optical arrangement.
Figure 37:
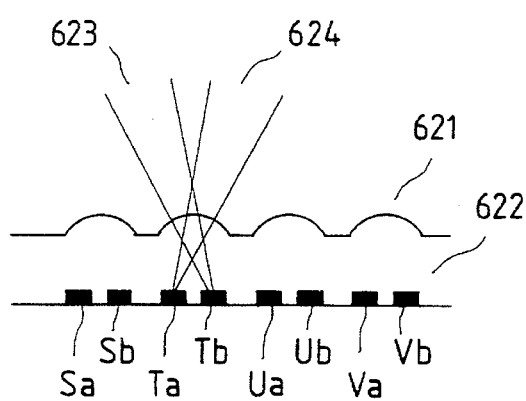
FIG. 37 is a partial enlarged view of a detection element.
Figure 38:
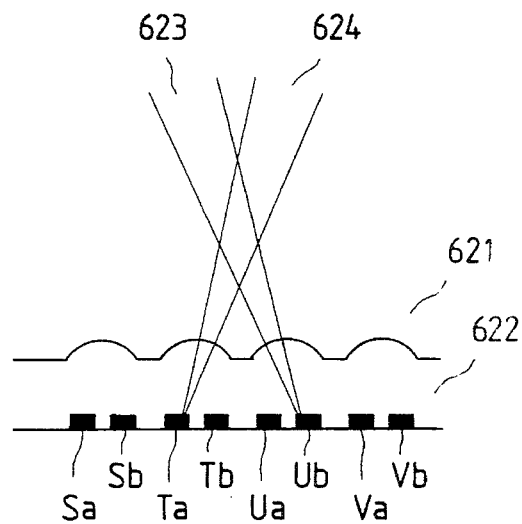
FIG. 38 is a partial enlarged view of the detection element.

FIGS. 35A and 35B respectively show calculation results of data shown in FIGS. 30B and 30D for n=m. Upon comparison with correlation data shown in FIGS. 30C and 30E and FIGS. 32A and 32B obtained from the data shown in FIGS. 30B and 30D, since no peak is generated at the position of n=0 in FIGS. 35A and 35B, peaks 521 and 522 having maximum values can be detected as correlation peaks.

As described above, according to this modification, since the influence of a correlation strongly appearing near the origin in the correlation calculation can be removed, the defocusing amount and direction can be easily detected.

The present invention is not limited to the arrangements of the above embodiments, and various modifications may be made within the spirit and scope of the invention.

What is claimed is:

1. An apparatus for detecting a focus adjustment state of an objective lens, said apparatus comprising:

photoelectric conversion means for receiving a light beam transmitted through the objective lens and comprising a photosensor array;

area defining means for defining different areas of a pupil of the objective lens, and arranged so that light beams passing through the different areas overlap each other on said photoelectric conversion means when the objective lens is at an in-focus state; and calculation means for calculating an autocorrelation from an output signal from said photoelectric conversion means, wherein said photoelectric conversion means serves as both image pickup means for picking up an image of an object, and image receiving means for focus detection.

2. An apparatus according to claim 1, wherein said area defining means comprises a mask having a plurality of apertures.

3. An apparatus according to claim 1, wherein said area defining means has at least three apertures having different inter-aperture intervals.

4. An apparatus according to claim 3, wherein said calculation means calculates a defocusing amount from a peak position of an autocorrelation coefficient, and a defocusing direction from a relationship between magnitudes of signals located at positions displaced by an interval corresponding to the defocusing amount.

5. An apparatus according to claim 1, wherein said area defining means varies amounts of light passing through the different areas.

6. An apparatus according to claim 5, wherein said area defining means includes apertures through which the light beams pass, the apertures having different areas in order to vary the amounts of light passing through the different areas.

7. An apparatus according to claim 5, wherein said area defining means comprises an optical filter to vary the amounts of light passing through the different areas.

8. An apparatus according to claim 5, wherein said calculation means calculates a defocusing amount from a peak position of an autocorrelation coefficient, and a defocusing direction from a relationship between magnitudes of signals located at positions displaced by an interval corresponding to the defocusing amount.

9. An apparatus according to claim 1, wherein said area defining means comprises a mirror for guiding a light beam to an optical finder.

10. An apparatus according to claim 1, wherein the autocorrelation $C(\tau)$ is given by:

$$C(t)=1/T\int_o^T x(t)\times x(t+\tau)dt$$

where x(t) is the output signal.

11. An apparatus according to claim 1, further comprising means for performing focus adjustment by adjusting a relative interval between said photoelectric conversion means and the objective lens.

12. An apparatus according to claim 1, wherein said calculation means calculates a defocusing amount from a peak position of an autocorrelation coefficient, and a defocusing direction from a relationship between magnitudes of signals located at positions displaced by an interval corresponding to the defocusing amount.

13. An apparatus according to claim 1, wherein said calculation means comprises means for executing electrical filter processing of the output signal.

14. An apparatus for detecting a focus adjustment state of an imaging lens, said apparatus comprising:

photoelectric conversion means for receiving a light beam transmitted through the imaging lens, said photoelectric conversion means comprising a photosensor array;

area defining means for defining different areas of a pupil of the imaging lens, said area defining means being arranged so that light beams passing through the different areas of the pupil of the imaging lens overlap each other on said photoelectric conversion means when the imaging lens is at an in-focus state; and calculation means for calculating an autocorrelation from an output signal from said photoelectric conversion means, an output of said photoelectric conversion means being used for detecting a focusing state of said imaging lens and taking a photo of an object.

15. An apparatus according to claim 14, wherein said area defining means comprises a mask having a plurality of apertures.

16. An apparatus according to claim 14, wherein said area defining means has at least three apertures having different inter-aperture intervals.

17. An apparatus according to claim 14, wherein said area defining means varies amounts of light passing through the different areas.

18. An apparatus according to claim 17, wherein said area defining means has apertures through which the light beams pass, the apertures having different areas in order to vary the amounts of light passing through the different areas.

19. An apparatus according to claim 17, wherein said area defining means comprises an optical filter to vary the amounts of light passing through the different areas.

20. An apparatus according to claim 14, wherein the autocorrelation $C(\tau)$ is given by:

$$C(t)=1/T\int_o^T x(t)\times x(t+\tau)dt$$

where x(t) is the output signal.

* * * * *

UNITED STATES PATENT AND TRADEMARK OFFICE
CERTIFICATE OF CORRECTION

PATENT NO. : 5,485,209
DATED : January 16, 1996
INVENTOR(S) : TOMOTAKA MURAMOTO, ET AL.

It is certified that error appears in the above-indentified patent and that said Letters Patent is hereby corrected as shown below:

COLUMN 1

Line 40, "means 602," should read --means 602.--; and
Line 59, "en" should read --an--.

COLUMN 6

Line 2, "on-the" should read --on the--; and
Line 26, "3exhibits," should read --3 exhibits,--.

COLUMN 7

Line 32, "different-" should read --different--.

COLUMN 9

Line 61, "small" should read --small $\tau$.--.

UNITED STATES PATENT AND TRADEMARK OFFICE
CERTIFICATE OF CORRECTION

PATENT NO. : 5,485,209
DATED : January 16, 1996
INVENTOR(S) : TOMOTAKA MURAMOTO, ET AL.

It is certified that error appears in the above-indentified patent and that said Letters Patent is hereby corrected as shown below:

COLUMN 11

Line 50, "of" should read --is--.

COLUMN 13

Line 13, $$\sum_{J=1}^{"J"}$$

should read $$\sum_{j=1}^{J}$$

UNITED STATES PATENT AND TRADEMARK OFFICE
CERTIFICATE OF CORRECTION

PATENT NO. : 5,485,209
DATED : January 16, 1996
INVENTOR(S) : Muramoto et al

It is certified that error appears in the above-indentified patent and that said Letters Patent is hereby corrected as shown below:

COLUMN 15

Line 44, "C" should read --c--.

Signed and Sealed this

Twenty-third Day of July, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,485,209
DATED : January 16, 1996
INVENTOR(S) : TOMOTAKA MURAMOTO, ET AL.

It is certified that error appears in the above-indentified patent and that said Letters Patent is hereby corrected as shown below:

On the Title page, item [54] "Title":

In the Title

"PUPIL DIVISIONAL TYPE FOCUSING POSITION DETECTION APPARATUS FOR ELECTRONIC CAMERAS" should read --APPARATUS FOR DETECTING FOCUS ADJUSTMENT STATE OF OBJECTIVE LENS--.

Signed and Sealed this

Third Day of September, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,485,209
DATED : January 16, 1996
INVENTOR(S) : TOMOTAKA MURAMOTO, ET AL.

It is certified that error appears in the above-indentified patent and that said Letters Patent is hereby corrected as shown below:

COLUMN 5

Line 50, $$C(\tau) = 1/T \int_o^T x(t) \times x(t+\tau) \, dt \quad \ldots\ldots (1)$$

should read $$C(\tau) = \frac{1}{T} \int_o^T x(t) \times x(t+\tau) \, dt \quad \ldots\ldots (1)$$

COLUMN 13

Line 13, $$\sum_{J=1}^{j}$$

should read $$\sum_{j=1}^{J}$$

UNITED STATES PATENT AND TRADEMARK OFFICE
CERTIFICATE OF CORRECTION

PATENT NO. : 5,485,209

DATED : January 16, 1996

INVENTOR(S) : TOMOTAKA MURAMOTO, ET AL.

It is certified that error appears in the above-indentified patent and that said Letters Patent is hereby corrected as shown below:

COLUMN 19

Line 20, $$C(t) = 1/T \int_o^T x(t) \times x(t+\tau) \, dt$$

should read $$C(\tau) = \frac{1}{T} \int_o^T x(t) \times x(t+\tau) \, dt$$

UNITED STATES PATENT AND TRADEMARK OFFICE
CERTIFICATE OF CORRECTION

PATENT NO. : 5,485,209
DATED : January 16, 1996
INVENTOR(S) : TOMOTAKA MURAMOTO, ET AL.

It is certified that error appears in the above-indentified patent and that said Letters Patent is hereby corrected as shown below:

<u>COLUMN 20</u>

$$C(t) = 1/T \int_o^T x(t) \times x(t+\tau) dt$$

should read $$C(\tau) = \frac{1}{T} \int_o^T x(t) \times X(t+\tau) dt$$

Signed and Sealed this

Fifteenth Day of October, 1996

Attest:

BRUCE LEHMAN

*Attesting Officer*          *Commissioner of Patents and Trademarks*